(12) United States Patent
Ito et al.

(10) Patent No.: US 7,428,534 B2
(45) Date of Patent: Sep. 23, 2008

(54) INFORMATION RETRIEVAL SYSTEM AND INFORMATION RETRIEVAL METHOD USING NETWORK

(75) Inventors: Shinichi Ito, Hamamatsu (JP); Taiki Kamiya, Hamamatsu (JP); Yasuhiko Asahi, Hamamatsu (JP); Taro Tokuhiro, Hamamatsu (JP); Seiichi Yamaguchi, Hamamatsu (JP); Hisanori Murakami, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 28 days.

(21) Appl. No.: 09/823,704

(22) Filed: Mar. 30, 2001

(65) Prior Publication Data
US 2002/0065817 A1 May 30, 2002

(30) Foreign Application Priority Data

Nov. 27, 2000 (JP) ............................ 2000-359742
Dec. 28, 2000 (JP) ............................ 2000-400861

(51) Int. Cl.
*G06F 17/30* (2006.01)
(52) U.S. Cl. ............................................. 707/5
(58) Field of Classification Search ............... 707/5, 707/10, 1, 2, 3, 104.1; 705/26, 37; 715/513; 700/214; 348/473; 709/219, 224; 84/470 R
See application file for complete search history.

(56) References Cited

U.S. PATENT DOCUMENTS

| | | | |
|---|---|---|---|
| 4,789,928 A * | 12/1988 | Fujisaki | ........................ 705/37 |
| 5,604,322 A | 2/1997 | Kikuchi | |
| 5,900,608 A | 5/1999 | Iida | |
| 5,949,492 A * | 9/1999 | Mankovitz | ................... 348/473 |
| 5,963,957 A | 10/1999 | Hoffberg | |
| 5,969,283 A | 10/1999 | Looney | |
| 6,029,141 A | 2/2000 | Bezos et al. | |
| 6,029,142 A | 2/2000 | Hill | |
| 6,096,962 A * | 8/2000 | Crowley | ....................... 84/611 |

(Continued)

FOREIGN PATENT DOCUMENTS

JP        6187359        7/1994

(Continued)

OTHER PUBLICATIONS

"New Century Music Life to Enjoy Via Music Distribution", PC Style 21, May 2000, pp. 51-61 and PC Style 21, Jan. 2000, pp. 19-27.

(Continued)

*Primary Examiner*—Etienne P LeRoux
(74) *Attorney, Agent, or Firm*—Morrison & Foerster LLP

(57) ABSTRACT

Client is supplied in advance with a storage medium that has stored therein a pseudo display program, identical or similar to at least a portion of a display program of a Web site for selling or distributing products or information, along with URL information. The client opens or displays a pseudo Web site using the previously-supplied pseudo display program, without intervention of a network. When a desired product or information to be purchased by or distributed to a user is selected on the displayed pseudo Web site, a hyperlink connects the client to the real Web site via a network, after which the client goes forward with proceedings for purchase or distribution of the desired product or information by communicating with the real Web site.

6 Claims, 17 Drawing Sheets

U.S. PATENT DOCUMENTS

| | | | |
|---|---|---|---|
| 6,144,958 A * | 11/2000 | Ortega et al. ..................... 707/5 |
| 6,156,964 A * | 12/2000 | Sahai et al. ................ 84/470 R |
| 6,405,203 B1 * | 6/2002 | Collart ......................... 707/10 |
| 6,460,060 B1 * | 10/2002 | Maddalozzo et al. ........ 715/513 |
| 6,502,194 B1 * | 12/2002 | Berman et al. ................. 726/28 |
| 6,535,889 B1 * | 3/2003 | Headrick et al. .......... 707/104.1 |
| 6,735,430 B1 * | 5/2004 | Farley et al. ............. 455/414.1 |
| 2002/0062357 A1 * | 5/2002 | Srinivasan ................... 709/219 |
| 2002/0068991 A1 * | 6/2002 | Fitzsimmons, Jr. .......... 700/214 |
| 2003/0154135 A1 * | 8/2003 | Covington et al. ............. 705/26 |

FOREIGN PATENT DOCUMENTS

| | | |
|---|---|---|
| JP | 7191668 | 7/1995 |
| JP | 10-149372 | 6/1998 |
| JP | 10-162079 | 6/1998 |
| JP | 11-185381 | 7/1999 |
| JP | 11230762 | 8/1999 |
| JP | 11-265388 | 9/1999 |
| JP | 2000-285155 | 10/2000 |
| JP | 2000-357191 | 12/2000 |
| WO | WO 96/09591 | 3/1996 |
| WO | WO 99/21186 | 4/1999 |
| WO | WO-00/42555 | 7/2000 |
| WO | WO-00/54187 | 9/2000 |

OTHER PUBLICATIONS

"Accelerating Music Distribution, This is an Attention-Getting Website!", PC Style 21, Jan. 2000, pp. 28-41 and 179.

Musicnotes.com web site revolutionized sidtribution and deliver of sheet music, Jul. 13, 1999, XP002969665.

Redeout, E. Sibilius 1.0 Keyboard, Music Player Network, San Francisco, CA, US, vol. 25, No. 4, Apr. 1999, XP000823548, ISSN 0730-0158.

Katsuhito Shiroida, "Can Retrieve Desired Information in One Try! Electronic Mail, Homepage, Etc. How To Arrange Digital Documents 'Comfortably,'" PC Style 21, vol. 1, Issue 8, p. 140 (Jul. 18, 2000).

"Secret Download Manual," 7th Time, PC Japan, vol. 5, Issue 5, p. 174 (May 1, 2000).

\* cited by examiner

FIG. 14

| MUSIC PIECE LISTING / JAPANESE MUSIC MENU / MUSIC PIECE | | | | JAPANESE MUSIC MENU ▲  TOP ▲ |
|---|---|---|---|---|
| TITLE OF MUSIC COMPOSITION | NAME OF ARTIST | NAME OF COMPOSER | NAME OF LYRIC WRITER | |
| ... | ... | ... | ... | ACCESS |
| | | | | ACCESS |
| | | | | ACCESS |
| | | | | ACCESS |
| | | | | ACCESS |
| ... | ... | ... | ... | ... |
| | | | | ACCESS |
| | | | | ACCESS |
| | | | | PREVIOUS PAGE ▲  NEXT PAGE ▼ |

FIG. 15

MUSIC PIECE DISTRIBUTION SERVICE

QUICK SEARCH

○ MIDI FILE    ◉ TITLE OF MUSICAL COMPOSITION
○ MUSICAL SCORE    ○ NAME OF ARTIST

[        ]  [GO!]

( DETAILED SEARCH )

~29

SEARCH
　SEARCH FOR MIDI MUSIC PIECE

SELECT OF EQUIPMENT TYPE

DATA TYPE [▼]
　　　　SELECTION OF TYPE OF EQUIPMENT [▼]
　　　　　　　　　　　　GENRE [▼]
　　　　　　TITLE OF MUSICAL COMPOSITION [▼]
　　　　　　　　　　　　ARTIST [  ][  ]
　　　　　　　　　　COMPOSER [  ][  ]
　　　　　　　　　LYRIC WRITER [  ][  ]
　　　　　　　INITIAL SINGING PHRASE [        ]
　　　　　　　　　ORDER OF DISPLAY [▼][▼]

[SEARCH] [CLEAR]

DATA TYPE
DATA FOR KARAOKE
DATA FOR GUITAR
DATA FOR ELECTRONIC PIANO
DATA FOR PORTABLE KEYBOARD
DATA FOR ALL XG T.G.
DATA DEDICATED TO PARTICULAR T.G. (MODEL A)
DATA DEDICATED TO PARTICULAR T.G. (MODEL A + PLUG-IN B)
DATA DEDICATED TO PARTICULAR T.G. (MODEL A + PLUG-IN C)
DATA DEDICATED TO PARTICULAR T.G. (MODEL A + PLUG-IN D)
DATA DEDICATED TO PARTICULAR T.G. (MEDEL E)

SELECTION OF TYPE OF PORTABLE KEYBOARD
MODEL F
MODEL G
MODEL H
MODEL I

SELECTION OF GENRE
CLASSICA MUSIC
ROCK,POPS
FOLK,COUNTRY
EASY LISTENING
JAZZ,FUSION
TECHNO
JAPANESE POPS
ANIMATION,MUSIC FOR CHILDREN

SEARCH

SEARCH FOR MIDI MUSIC PIECE

SELECT OF EQUIPMENT TYPE

| | |
|---:|:---|
| DATA TYPE | ▼ |
| SELECTION OF TYPE OF EQUIPMENT | ▼ |
| GENRE | ▼ |
| TITLE OF MUSICAL COMPOSITION | ▼ |
| ARTIST | |
| COMPOSER | |
| LYRIC WRITER | |
| INITIAL SINGING PHRASE | |
| ORDER OF DISPLAY | ▼  ▼ |

SEARCH   CLEAR

SEARCH RESULT

SUCCESSIVE TEST-LISTENING

| SELECTION | TEST-LISTENING | TITLE OF MUSICAL | ARTIST | INITIAL SINGING PHRASE | TYPE | CART | DETAIL |
|---|---|---|---|---|---|---|---|
| ☐ | ▶ | | | | XG | ¥200 | DETAIL |
| ☐ | ▶ | | | | XG | ¥200 | DETAIL |
| ☐ | ▶ | | | | XG | ¥200 | DETAIL |
| ☐ | ▶ | | | | XG | ¥200 | DETAIL |
| ☐ | ▶ | | | | XG | ¥200 | DETAIL |

| PROFILE | PURCHASE (TO CART) |
|---|---|
| TITLE OF MUSICAL COMPOSITION/ARTIST | ¥200 |

TITLE OF MUSICAL COMPOSITION

ARTIST

GENRE
JAPANESE POPS

FILE TYPE
XG

COMPOSER

LYRIC WRITER

LYRIC WRITER

PERFORMANCE TIME
4'01"

○ SEARCH FOR ARTIST     ○ SEARCH FOR COMPOSER     ○ SEARCH FOR LYRIC WRITER

PRODUCTS OF SAME TITLE OF MUSICAL COMPOSITION
DIGITAL CONTENTS

| ▷ | DATA FOR XG | | XG |
|---|---|---|---|
| | DATA FOR KARAOKE | | KARAOKE |

※ ▷ DIGITAL CONTENTS CURRENTLY SEARCHED FOR

| | 3RD MUSIC PIECE |
|---|---|
| | 9TH MUSIC PIECE |

FIG. 18

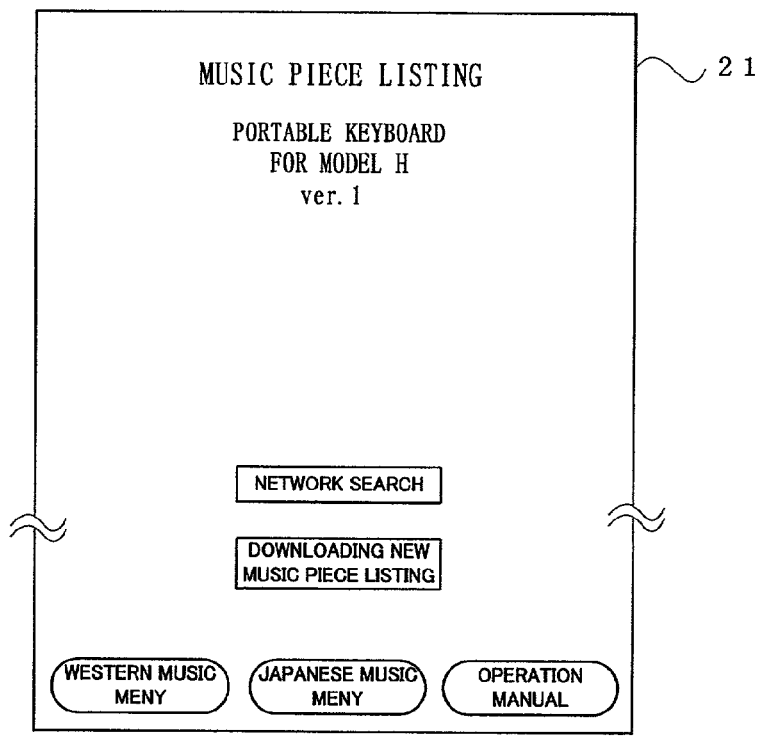
FIG. 22
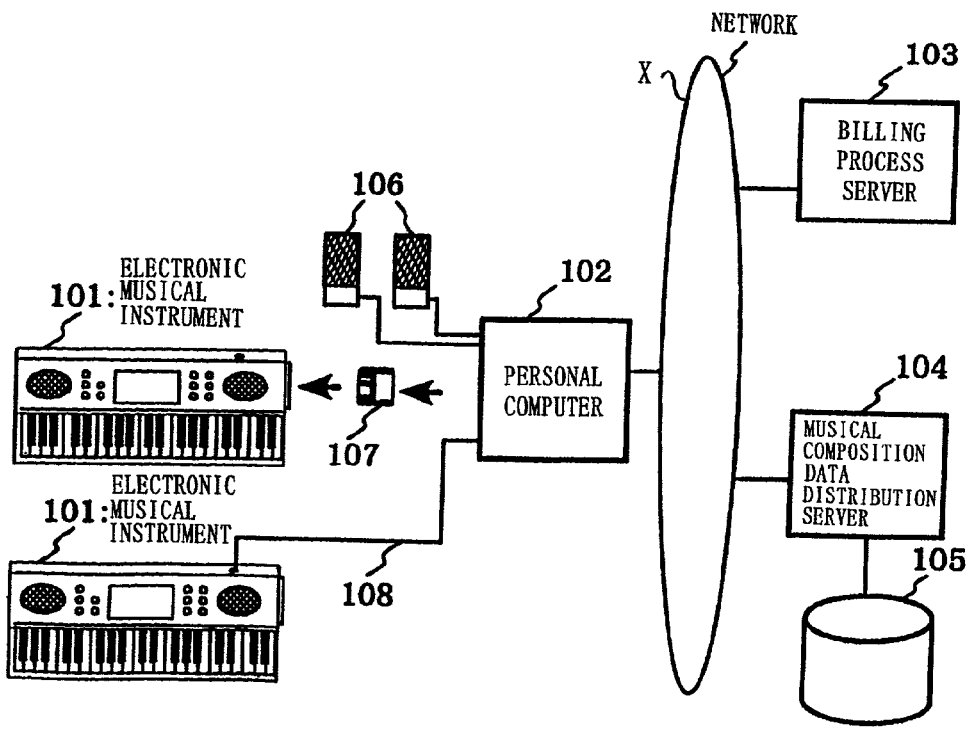
(PRIOR ART) FIG. 23

INFORMATION RETRIEVAL SYSTEM AND INFORMATION RETRIEVAL METHOD USING NETWORK

BACKGROUND OF THE INVENTION

The present invention relates to information retrieval systems, information retrieval apparatus, information retrieval methods and storage media by which user-desired information can be searched for and distributed via a wired or wireless communication network such as the Internet. Particularly, the present invention relates to an improved information retrieval system, information retrieval apparatus, information retrieval method and storage medium by which user-desired information can be readily searched for in a prompt manner. Furthermore, the present invention relates to an improved information retrieval system, information retrieval apparatus, information retrieval method and storage medium by which user-desired information can be retrieved or obtained in an efficient manner The present invention also relates to a storage medium, product ordering method and apparatus and storage medium with a product ordering program recorded therein which are used by a human user to order a desired product via a communication network, and which can suitably search, on an off-line basis, distribution services of musical composition data or other information to locate a particular music piece or other information to be distributed to the user.

Recently, with the rapid development of wired and wireless communication networks typified by the Internet, everyone can obtain any desired information at any desired time by accessing a particular WWW (acronym for World Wide Web) site on a communication network by use of a personal computer, cellular phone or the like. Examples of information obtainable by users from such WWW sites include character data, image data, musical composition data and so on. These communication networks, such as the Internet, are being inundated with an extremely great amount of information, so that a user must search such an extremely great amount of information for any desired information. Among various schemes for searching for desired information is one that conducts a search using, as a searching clue, keywords pertaining to the desired information and displays a listing of candidate WWW sites that are supposed to possess relevant information corresponding to the keywords; for example, this scheme displays Uniform Resource Locators (i.e., Internet addresses commonly known as URLs) as results of the search. In such a scheme, the user is allowed to ultimately hit one or more appropriate WWW sites possessing the user-desired information by sequentially narrowing the candidate WWW sites by use of a plurality of specific keywords or the like.

The user can obtain or retrieve and make use of the thus searched-for information. Namely, the user can access the desired WWW site on a communication network using a personal computer, cellular phone or the like and thereby obtain (i.e., download) the desired or target information to his or her personal computer, cellular phone or the like for payment or on a charge-free basis (i.e., with or without payment due). For instance, when the user wants to listen to a desired music piece, the user can obtain or download a musical composition data file of the desired music piece from a predetermined site having prestored therein the musical composition data file, for payment or on a charge-free basis, by accessing the predetermined site via a communication network.

However, it would usually take a considerable time to search for and obtain user-desired information (e.g., character data representing new product information about particular equipment, such as an electronic musical instrument possessed by the user, or musical composition data capable of being automatically performed by the user-possessed electronic musical instrument), via a wired or wireless communication network such as the Internet, from among an enormous amount of information inundating the communication network. Namely, with the above-mentioned conventional search scheme, the user can not readily hit an exact WWW site containing the desired information unless appropriate keywords are input. But, it has been quite difficult for virtually everyone, particularly a beginner or insufficiently-experienced user, to select appropriate keywords with which to search for the desired information. Furthermore, due to the recent explosive increase in the amount of information on the communication networks, to search for an exact WWW site containing desired or target information is nowadays an even more time-consuming operation even when the user selects and enters appropriate keywords. Besides, even when the WWW site containing desired or target information has been hit quickly, the user has to learn how to properly use the WWW site before actually using the WWW site, which would also take a long time. Further, the connection to the Internet or other communication network must be continued while the search is being made for the WWW site and while the thus searched-for WWW site is being used. Therefore, as the time lengths of the search and use of the WWW site increase, the user has to pay a greater amount of money for the connection to the communication network. Such great connection charges significantly weaken potential users' eagerness or motivation to access WWW sites, so that the number of users' access to the WWW sites would undesirably decrease.

In addition, because the conventional technology does not allow a user to obtain only a selected portion of information prestored in a particular WWW site, the user would have to collectively obtain the whole information (e.g., an entire or complete musical composition data file of a particular music piece) including portions unnecessary for the user. Thus gaining the whole information including unnecessary portions, rather than only the necessary portion of the information, is very wasteful, time-consuming and hence inefficient.

For example, there are being provided today data distribution services in which a multiplicity of sets or files of musical composition data are prestored in a database on the Internet and a desired one of the prestored musical composition data files is distributed via the communication network to a user's personal computer in response to access by the user. Among such data distribution services is the "Mid Radio" (trademark of Yamaha Corporation) where musical composition data files of about 7,000 music pieces are prestored. FIG. 23 is a block diagram showing a general setup of an example of the conventionally-known music-piece-data distribution system. As seen in FIG. 23, the music-piece-data distribution system includes an electronic musical instrument 101, a personal computer 102, a communication network X such as the Internet, a billing process server 103, a music-piece-data distribution server 104, and a database of musical composition data 105. Reference numeral 106 represents speakers attached to the personal computer 102, 107 a flexible magnetic disk (floppy disk), and 108 a serial cable. The personal computer 102 is dialup-connected through telephone lines to the communication network x.

The music-piece-data distribution server 104 is, for example, a WWW (Word Wide Web) server, and the database 105 is connected to the music-piece-data distribution server 104. The billing process server 103, which is managed by a credit company, bank or the like, is connected to the communication network X and is equipped with a database storing billing information of individual clients. The music-piece-data distribution server 104 is responsive to a request from the personal computer 102 for distributing a designated musical composition data file to the personal computer 102. Note that before distributing the designated musical composition data file, the music-piece-data distribution server 104 transmits, to the billing process server 103, information indicative of a price, payment terms and conditions, etc. of the designated musical composition data file for billing and payment purposes. The billing process server 103 accesses the personal computer 102 in order to bill the user of the personal computer 102. Payment of the charged amount may be made by a credit card or prepaid card. After completion of the billing operation, the billing process server 103 accesses the music-piece-data distribution server 104 to inform that the necessary billing operation has been completed.

The music-piece-data distribution server 104 retrieves the designated or requested musical composition data file from the database 105 and distributes the thus-retrieved musical composition data file to the personal computer 102. In turn, the personal computer 102 registers the distributed musical composition data file into a predetermined directory of a hard disk. File of the musical composition data is based on the SMF (Standard MIDI File) or other specific format. Typically, each musical composition data file comprises combinations of event data and timing data. Examples of the event data include note-on, note-off, program change events, etc. Each timing data is indicative of time having elapsed from the occurrence time of the immediately preceding event.

Where a tone generator is incorporated in or connected to the personal computer 102, tones can be audibly reproduced through the speakers 106 by performing the musical composition data file. In an alternative, the musical composition data file is copied onto the flexible magnetic disk (floppy disk) 107 so that it can be inserted into the electronic musical instrument 101 for audible reproduction or performance. In another alternative, the musical composition data file is transferred via the serial cable 108 to the electronic musical instrument 101 for performance. Using the downloaded musical composition data file, the electronic musical instrument 101 allows the user to practice a so-called "minus-one performance" with tones of a particular performance part prevented from being reproduced, or practice playing with tones only of a particular performance part reproduced, or practice playing based on key depression instructions of a particular performance part.

However, in order to initiate a search for a desired musical composition data file from among a multiplicity of musical composition data files, it is necessary for the user to type the name of the desired music piece in a text box on a screen, or select and type search conditions about the desired musical composition data file in accordance with search steps shown on the screen, which would require not a little time and effort. Further, a considerable time would be taken before a result of the search is gained. Also, depending on the entered search conditions, the desired musical composition data file can not be properly located, in which case there would arise a need to select the name of the desired music piece file from among a listing of music piece names obtained as a result of the search. Thus, inexperienced users tend to require a longer searching time that leads to increased communication and connection charges, which would make the users reluctant to use the distribution services. Furthermore, there are many types of musical composition data files, such as karaoke data, guitar playing data, electronic piano playing data, etc. Therefore, if a search is conducted without taking the particular type of the desired data file into account, even a musical composition data file matching with a music piece name entered by the user would sometimes fail to properly fit an electronic musical instrument, tone generator or other equipment being used by the user. For this reason, each time a search is to be made for a musical composition data file, it is necessary for the user to specify the type of the musical composition data file so that the searched-for musical composition data file can fit his or her equipment, which would result in even greater loads on the user.

SUMMARY OF THE INVENTION

It is therefore an object of the present invention to provide an information retrieval system, information retrieval apparatus, information retrieval method, information retrieval program and storage medium storing such an information retrieval program by which a user can readily access desired information via a communication network in a prompt manner.

It is another object of the present invention to provide an information retrieval system, information retrieval apparatus, information retrieval method, information retrieval program and storage medium storing such an information retrieval program by which a user can obtain desired information via a communication network in an efficient manner.

It is still another object of the present invention to provide a program, program storage medium, product ordering method and apparatus, a product ordering program and storage medium storing such a product ordering program by which a user can suitably select, on an off line basis, a desired product from among many products.

In order to accomplish the above-mentioned objects, the present invention provides an apparatus for retrieving information from a site on a network, which comprises: a storage device having prestored therein various information about predetermined one or more sites and search information for calling up the sites; a display device; an operator unit; and a processor device coupled with the storage device, the display device and the operator unit. The processor device of the apparatus is adapted to: read out the information stored in the storage device; cause the read-out information to be displayed on the display device; transmit, when a predetermined item of information is selected from among the information displayed on the display device in response to an operation of the operator unit, the search information corresponding to the selected item of information to the network; and receive information supplied from a particular one of the sites, via the network, in response to the transmitted search information.

The processor device is further adapted to cause the information received from the particular site to be displayed on the display device. For example, the storage device has stored therein display program information for providing a visual display content identical or similar to a Web page for each of the sites and address information for calling up the Web page of each of the sites. The processor device first causes a visual display content identical or similar to the Web page for one of the sites selected in response to an operation of the operation unit to be displayed on the display device, without accessing the network, on the basis of readout of the display program information stored in the storage device, and then, when a predetermined item of information is selected from among the information displayed on the display device in response to an operation of the operator unit, transmits, as the search information, the address information of the Web page corresponding to the selected predetermined item of information to the network, to thereby establish a connection with one of the sites on the network which corresponds to the transmitted address information.

The present invention also provides a method for selling or distributing a product or information via a network, which comprises: a step of distributing in advance, to a client, a pseudo display program identical or similar to at least a portion of a display program at a Web site for selling or distributing a product or information; a step of falsely opening the Web site by means of a computer of the client using the pseudo display program distributed by the step of distributing, without intervention of the network; and a step of actually connecting to the Web site via the network at a predetermined stage in the course of execution of the pseudo display program and then going forward with a procedure for selling or distributing the product or information in accordance with a visual presentation based on the display program supplied by the Web site.

For example, the inventive method further comprises a step of allowing a portion of the product or information to be sold or distributed in the course of the procedure for selling or distributing the product or information, and only a portion of the product or information can be sold or distributed by the Web site. For example, the product or information is musical composition data, and a portion of a musical composition data file of a music piece can be sold or distributed by the Web site.

The present invention also provides a computer-readable storage medium containing a file to be used by a computer of a client so that the client can receive a desired item from a server via a network, the file including: a plurality of items of specifying information each specifying one of a limited plurality of items that are among all items capable of being supplied by the server; and a plurality of items of display information each indicative of a display object or content that shows one of the limited plurality of items. In the present invention, each of the items of specifying information and display information is described in a hyperlink-enabling format, and each of the items of specifying information and/or a visual presentation of the display object or content are linked with an address in the server. For example, each of the items capable of being supplied by the server is a product or information, and the file is used when the client desires to cause the computer to perform a procedure for ordering a desired product or information from the server.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Furthermore, the processor used in the present invention may comprise a dedicated processor with dedicated logic built in hardware as well as a computer or other general-purpose type processor capable of executing a desired software program.

While the described embodiments represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which:

FIG. 14 is a diagram showing one specific example of a music piece listing page corresponding to an initial letter of a selected one of music piece names listed in the alphabetical order;

FIG. 15 is a diagram showing a specific example of a top page screen shown in FIG. 13;

FIGS. 16A to 16D are diagrams showing a specific example of a search input screen shown in FIG. 13;

FIG. 17 is a diagram showing one specific example of a search result screen of FIG. 13.

FIG. 18 is a diagram showing a specific example of a profile screen of FIG. 13;

FIG. 22 is a diagram showing another example of the music piece listing, which is explanatory of still another embodiment of the present invention; and FIG. 23 is a diagram showing a general setup of an example of a conventionally-known music-piece-data distribution system.

DETAILED DESCRIPTION OF THE EMBODIMENTS

Figure 1:
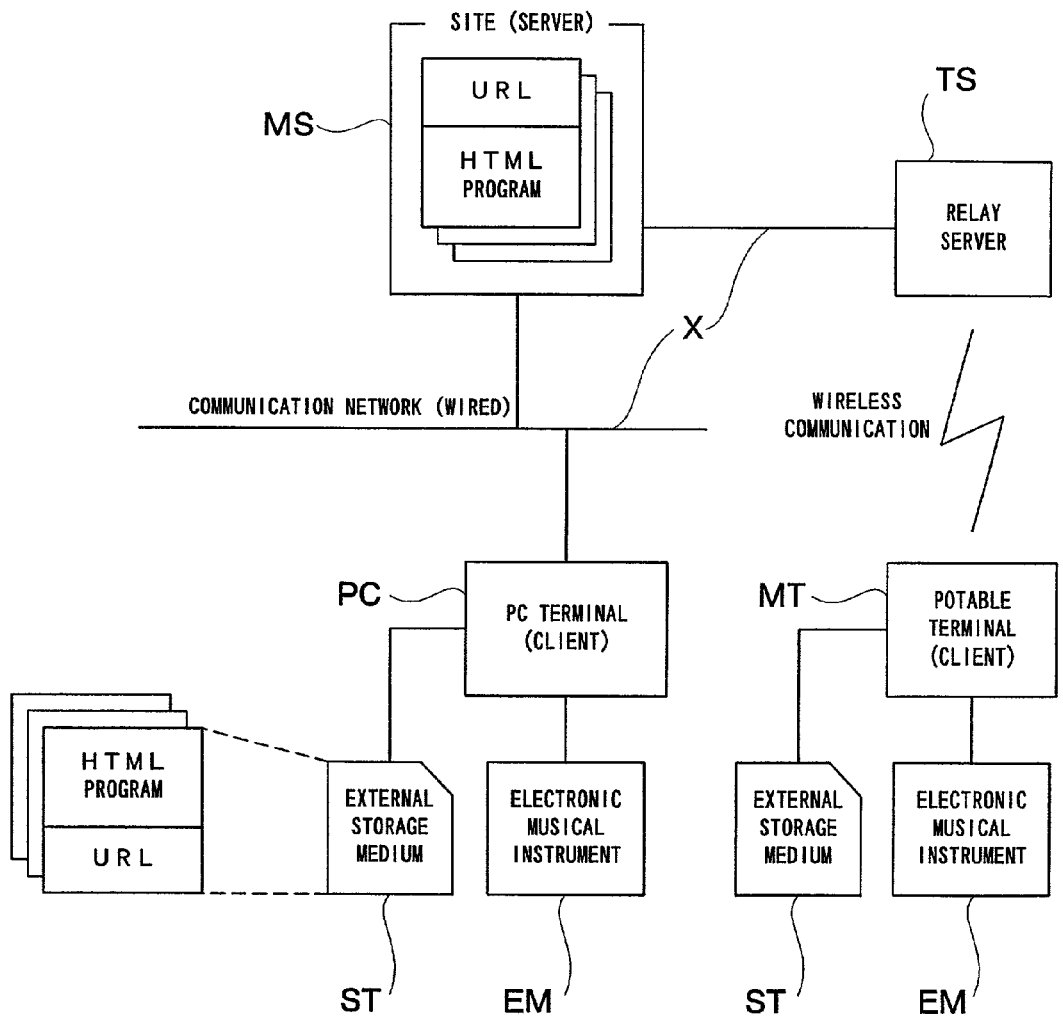
FIG. 1 is a block diagram showing a general setup of an information retrieval system in accordance with an embodiment of the present invention.

Before going into details of embodiments according to the present invention, a broad outline is given below about an information retrieval system in accordance with a first embodiment of the present invention. This information retrieval system is designed to search for desired information and transfer the searched-for information to a user, and includes an information search/retrieval server and an information search apparatus of a client. The information search/retrieval server includes an information storage section storing a number of items of information corresponding to predetermined search information, and an input/output section for reading out, from the information storage section, one of the items of information which corresponds to input search information and then outputting the read-out information. The client's information search apparatus includes: a storage section having stored therein predetermined information to be distributed to individual users and search information corresponding to the predetermined information; a readout section for reading out the information stored in the storage section; a display section for displaying information; a pointing section for pointing to a desired one of items of the information displayed on the display section; and an information obtaining section for transmitting the search information to the information search/retrieval server to thereby obtain, from the information search/retrieval server, predetermined information corresponding to the search information. When a predetermined one of the items of information displayed on the display section is pointed to via the pointing section, the client's information search apparatus reads out the search information corresponding to the pointed-to predetermined item of information from the storage section, and obtains the predetermined information from the information search/retrieval server on the basis of the read-out search information.

Such arrangements allow a user to readily obtain predetermined information from the information search/retrieval server, using the information stored in the storage section. Namely, the predetermined information stored in the storage section of the information search apparatus is displayed on the display section, and the user can point to a desired item of the displayed information using the pointing section. Regarding the information pointed by the pointing section, the search information corresponding to the information is read out from the storage section. Then, by transmitting the read-out search information to the information search/retrieval server, the predetermined information corresponding to the transmitted search information can be obtained from the search/retrieval server. Thus, the user is allowed to gain the search information related to user-desired information by merely pointing to the desired one of the items of the information read out from the storage section and displayed on the display section, without having to personally locate the search information, and then obtain the desired information from the search/retrieval server. Thus, by the storage section of the client's information search apparatus storing predetermined information and corresponding search information and the pointing section to allow the user to point to the information, the user-desired information can be readily obtained from the search/retrieval server via the communication network.

Another embodiment of the present invention is characterized in that only a selected portion of the desired item of information displayed on the display section of the client's information search apparatus can be obtained from the information search/retrieval server. Namely, by the storage section of the client's information search apparatus storing predetermined information and corresponding search information and also by allowing the user to select only a portion of the desired information, only a portion of the user-desired information can be readily obtained from the information search/retrieval server.

FIG. 1 is a block diagram showing a general setup of an information retrieval system in accordance with an embodiment of the present invention. As shown, the information retrieval system is made up of a Web server MS storing WWW (World Wide Web) sites or servers (hereinafter sometimes referred to simply as sites), a relay server TS, a communication network X, and client terminals such as a personal computer terminal PC and a portable terminal MT. As will be later described in detail, each of the various components (i.e., Web server MS, relay server TS, personal computer terminal PC and portable terminal MT) constituting the information retrieval system comprises an independent computer that includes a CPU, a ROM, a RAM, a communication interface, etc. Thus, each of the various components can transmit or receive various information (such as HTML programs and URLs (Uniform Resource Locators) to be described later) and various data (such as musical composition data to be described later), via the communication network X like the Internet, dedicated communication line, etc.

The information retrieval system may of course include other hardware components than the above-mentioned, but a description will be made hereinbelow in relation to a case where only minimum necessary resources are employed.

Each of the client terminals, including one or more personal computer terminals PC and portable terminals MT, can read out an HTML program from an associated external storage medium ST, and access any one of the sites stored in the Web server MS with reference to the URL attached in relation to the read-out HTML program. Namely, the Web server MS and each of the client terminals are interconnected via any of various communication networks X such as a LAN (Local Area Network), Internet and telephone line network. Thus, by connecting the client terminal to the communication network X for bidirectional communication between the client terminal and the Web server MS, the user can access one of the sites corresponding to the URL (Uniform Resource Locator) read out from the external storage medium ST or directly entered by the user, and thereby cause the site containing user-desired information and data to be displayed on a predetermined display device. Communication (transmission/reception) of information and data is carried out between the client terminal and the Web server MS, using a predetermined software program such as an Internet browser.

The portable terminal MT used as the client terminal is a small-sized terminal, such as a cellular phone or PDA (acronym for Personal Data (Digital) Assistant), which is capable of wireless communication. The portable terminal MT has a site display function in addition to the principal communication function. As with the personal computer terminal PC, the portable terminal MT includes a predetermined display device for displaying any site containing user-desired information and data. Note that when the portable terminal MT is connected to the Web server MS for bidirectional communication therebetween, the relay server TS intervenes. Namely, by the relay server TS relaying each signal to be communicated between the portable terminal MT and the Web server MS, the portable terminal MT can access the Web server MS.

It should also be understood that each of the client terminals in the inventive information retrieval system may be any other type than the above-mentioned personal computer terminal PC or portable terminal MT as long as it can obtain and then process an HTML program from the Web server MS. It should also be obvious that two or more client terminals may be connected to the communication network X. Further, although the instant embodiment is described herein in relation to the case where a site is created on the basis of an HTML program, it should be apparent that a site may be created on the basis of an other similar program, such as one using the well-known Java language.

As best shown in FIG. 1, the external storage medium ST may be connected to the client terminal such as the personal computer terminal or portable terminal PC or MT so that the client terminal PC or MT can obtain, from the external storage medium ST, predetermined information comprising combinations of HTML programs and URLs. Further, an electronic musical instrument EM is connectable to the client terminal. Specifically, in the instant embodiment, the external storage medium ST stores therein predetermined information comprising combinations of HTML programs and URLs, for accessing a plurality of sites associated with a plurality of electronic musical instruments EM (e.g., including the one purchased by a user and connected to the client terminal); such predetermined information is packaged along with the electronic musical instrument EM purchased by the user so that the user can have the predetermined information in advance before accessing the communication network X. The HTML programs stored in the external storage medium ST are programs capable of presenting, to the client terminal, sites of same contents as predetermined real sites (e.g., those corresponding to types and individual products of electronic musical instruments EM) on the communication network X, and each of the HTML programs is imparted with an URL that is an Internet address allocated to the corresponding site on the communication network X. Namely, each of the HTML programs is a source (i.e., displayed information) of a plurality of Web pages described in the HTML or HyperText Markup Language. Because the site display by the HTML program is a well-known technique, it will be described here. The URL is an Internet address to indicate the corresponding HTML program stored in a particular Wen server and composed of predetermined character string information.

The Web server MS is a server computer which has stored therein a multiplicity of HTML programs regarding sites to be used for presenting, to the client terminals, various information and data, and which, in response to a request (access) from any one of the client terminals, sends the client terminal one of the HTML programs corresponding to the client terminal's request. Namely, the Web server MS is connected with the client terminal via a dedicated line or communication network X such as the Internet, and, in response to access (e.g., designation of the URL), distributes to the client terminal the HTML program and various data of the corresponding site. In the Web site MS of the instant embodiment, there are prestored the HTML programs in association with various types of electronic musical instruments, which correspond to the information stored in the external storage media ST supplied to users of the electronic musical instruments.

Figure 2:
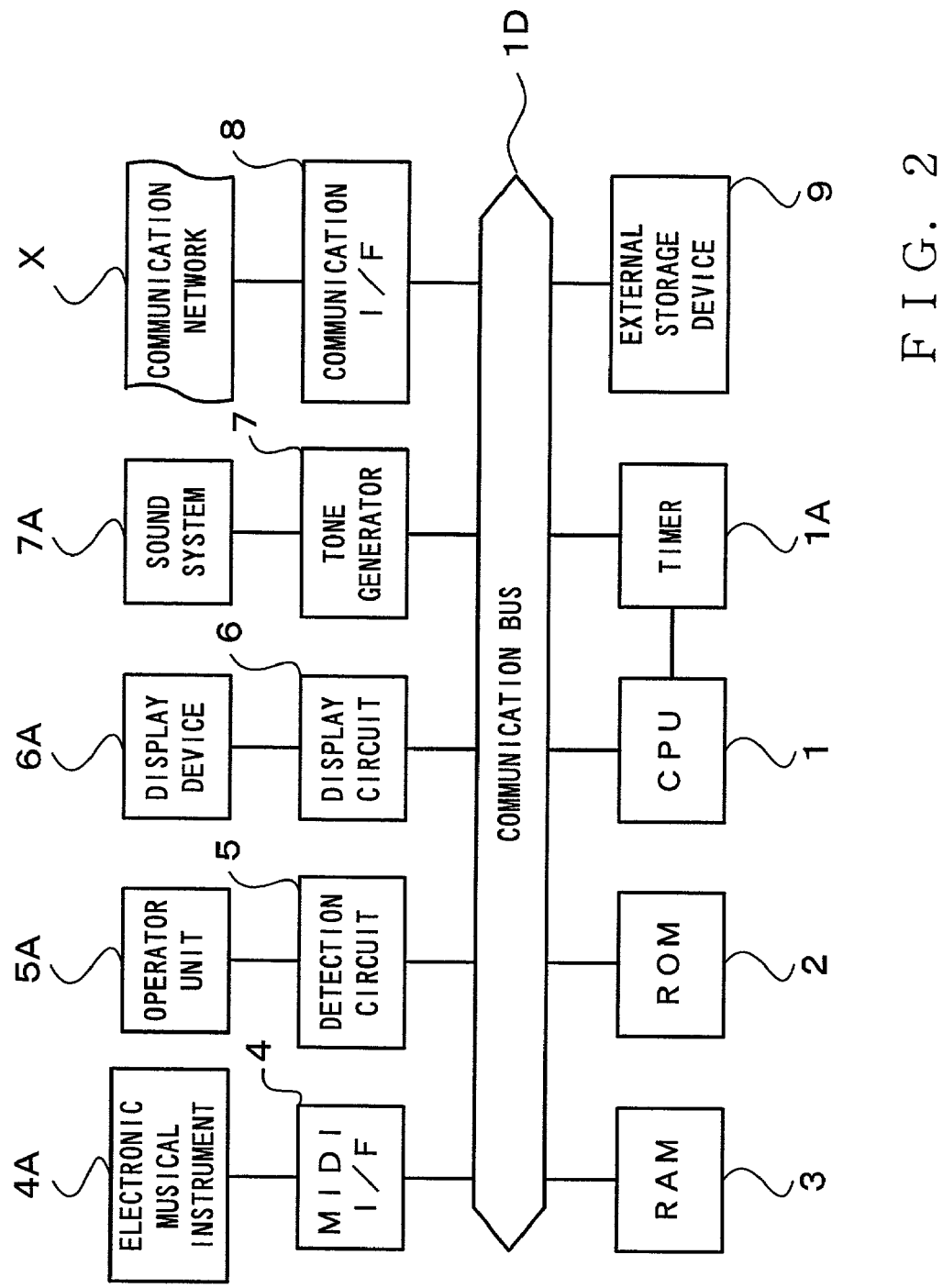
FIG. 2 is a block diagram showing an exemplary hardware setup of one of a personal computer terminal, portable terminal, Web server and relay server employed in the information retrieval system shown in FIG. 1.

With reference to FIG. 2, the following paragraphs describe an exemplary hardware setup of one of the personal computer terminal PC, portable terminal MT, Web server MS and relay server TS. Namely, because these personal computer terminal PC, portable terminal MT, Web server MS and relay server TS are similar in construction to each other, the hardware setup of only the personal computer terminal PC will be described primarily.

In the instant embodiment, the personal computer terminal PC is controlled by a microcomputer that includes a microprocessor unit (CPU) 1, a read-only memory (ROM) 2 and a random access memory (RAM) 3. The CPU 1 controls operation of all components in the terminal PC. To the CPU 1 are connected, via a communication bus (e.g., data and address bus) 1D, the read-only memory 2, random-access memory 3, MIDI interface 4, detection circuit 5, display circuit 6, tone generator (T.G.) circuit 7, communication interface 8 and external storage device 9. Also connected to the CPU 1 is a timer 1A for counting various time periods and signaling predetermined interrupt timing for timer interrupt processes. Namely, the timer 1A generates tempo clock pulses for counting various time intervals and setting a tempo at which a music piece is to be automatically performed. Frequency of the tempo clock pulses is adjustable via an panel operator unit 5A including various switches, operators, etc. Such tempo clock pulses generated by the timer 1A are given to the CPU 1 as processing timing instructions or as interrupt instructions. The CPU 1 carries out various processes in accordance with various instructions entered via the panel operator unit 5A (i.e., switch manipulation information). The various processes carried out by the CPU 1 in the instant embodiment include one for searching for and displaying a site-related screen, one for allowing a user to purchase only a selected portion of a musical composition data file, etc.

The ROM 2 stores therein various information including various programs to be executed by the CPU 1 and musical composition data. The RAM 3, which is used for storing various information such as an HTML program and musical composition data, is used as a working memory for temporarily storing various data occurring as the CPU 1 carries out a program, as well as a memory for storing a currently-executed program and data related to the currently-executed program. Further, predetermined address regions of the RAM 3 are used as registers, flags, tables, memories, etc. necessary for implementation of various functions of the instant embodiment.

The MIDI interface (I/F) 4 is designed to input MIDI-standard tone information (MIDI data) from the electronic musical instrument 4A to the personal computer terminal PC or outputting MIDI-standard tone information (MIDI data) from the personal computer terminal PC to the electronic musical instrument 4A or the like. Note that the electronic musical instrument 4A may be of any type, such as the keyboard type, guitar type, wind instrument type, percussion instrument type or gesture type, as long as it can generate MIDI data in response to manipulations by a user or player.

Note that the MIDI interface (I/F) 4 may be a general-purpose interface rather than a dedicated MIDI interface, such as RS232-C, USB (acronym for Universal Serial Bus) or IEEE1394, in which case other data than MIDI event data may be communicated at the same time. In the case where a general-purpose interface as mentioned above is used as the MIDI interface 4, the electronic musical instrument 4A can transmit/receive other data than the MIDI event data. Namely, the data format of the tone information may be any other appropriate format than the MIDI format, in which case the MIDI interface 4 and electronic musical instrument 4A are arranged to fit the data format used.

The panel operator unit 5A includes various types of operators, such as a mouse, keyboard, special switches and others. Among such operators may be a ten-button keypad for inputting numerical value data, keyboard for inputting character data, and panel switches. The detection circuit 5 constantly detects respective operational states of the individual operators on the operator unit 5A and outputs switch information, corresponding to the detected operational states of the operators, to the CPU 1 via the communication but (e.g., data and address bus) 1D. The display circuit 6 visually displays various information, such as controlling conditions of the CPU 1 as well as a site-related screen and musical composition data, on a display device 6A that may comprise an LCD (Liquid Crystal Device) or CRT (Cathode Ray Tube).

The tone generator (T.G.) circuit 7, which is capable of simultaneously generating tone signals in a plurality of channels, receives musical composition data supplied via the communication bus 1D and generates tone signals based on these received musical composition data. Each of the tone signals thus generated by the tone generator circuit 7 is audibly reproduced or sounded by a sound system 7A. The musical composition data may be in a digitally-coded data format such as the MIDI format or in a waveform sample data format such as the PCM, DPCM or ADPCM format. The tone generator circuit 7 and sound system 7A may be constructed in any desired conventionally-known manner.

Further, the communication interface 8 is connected to a communication network X, such as a LAN, the Internet or telephone line network, via which it may be connected to a predetermined Web sever MS (see FIG. 1) so as to input various information, such as an HTML program and musical composition data, to the personal computer terminal PC in question. Thus, in a situation where an HTML program and musical composition data to be reproduced are not contained in the ROM 2, external storage device (e.g., hard disk) 9 or the like of the personal computer terminal PC, such an HTML program and musical composition data can be downloaded from the Web server MS via the communication interface 8. In such a case, the personal computer terminal PC, which is a "client terminal", sends, via the communication interface 8 and communication network X, a command to request the Web server MS to download the HTML program and musical composition data. In response to the command from the personal computer terminal PC, the Web server MS delivers the requested HTML program and musical composition data to the personal computer terminal PC via the communication network X. The personal computer terminal PC receives the HTML program to thereby display a site based on the received HTML program and receives the musical composition data to thereby accumulatively store them into the external storage device (e.g., hard disk) 9. Note that the communication interface 8 and communication network X may be of a wired or wireless type; in an alternative, wired- and wireless-type communication interfaces 8 and communication networks X may be provided.

The external storage device 9 is provided for storing an HTML program, musical composition data and data pertaining to control of various program executed by the CPU 1. As will be later described in detail, the instant embodiment is arranged in such a manner that as the HTML program is read out from the external storage device 9 in response to a user's predetermined operation or manipulation, a predetermined pseudo site screen is displayed on the basis of the thus readout HTML program (which will be described later in relation to FIGS. 4 to 6). The user can then use the displayed pseudo site screen to access a real site screen (which will be described later in relation to FIGS. 8 and 9) on the communication network X, to thereby obtain various information from the site. Where a desired control program is not prestored in the ROM 2, the desired control program may be prestored in the external storage device (e.g., hard disk device) 9, so that, by reading the desired control program from the external storage device 9 into the RAM 3, the CPU 1 is allowed to operate in exactly the same way as in the case where the desired control program is stored in the program memory 2. This arrangement greatly facilitates version upgrade of the control program, addition of a new control program, etc. Note that the external storage device 9 may comprise any one or more of various removable-type media other than the hard disk (HD), such as a floppy disk (FD), compact disk (CD-ROM or CD-RAM), magneto-optical disk (MO) and digital versatile disk (DVD).

Also note that although the personal computer terminal PC, portable terminal MT, Web server MS and relay server TS are generally similar in construction to each other as stated above, the Web server MS and relay server TS need not necessarily be provided with the electronic musical instrument 4A, tone generator circuit 7 and sound system 7A.

Further, in the case of the portable terminal MT, the operator unit 5A includes various switches provided on (or within) the body of the terminal MT, and the display device 6A may be in the form of an LCD provided on (or within) the body of the terminal MT. It is preferable that the tone generator circuit 7 and sound system 7A (e.g., amplifiers and speakers) be provided on (or within) the body of the terminal MT. The communication interface 8 in the portable terminal MT is designed for wireless communication, which can communicate with the relay server TS. Of course, the portable terminal MT may also include an interface for wired communication in a similar manner to the personal computer terminal PC. The external storage device 9 may be incorporated previously within the body of the portable terminal MT, or may be provided separately from or externally to the body of the terminal MT for connection to the body via a cable or the like whenever necessary. In the case where the external storage device 9 is incorporated within the body of the terminal MT, the external storage device 9 is preferably in the form of a small-sized semiconductor memory. In the case where the external storage device 9 is provided separately or externally to the body of the terminal MT, it may be in the form of any one or combination of a hard disk (HD), floppy disk (FD), compact disk (CD-ROM or CD-RAM), magneto-optical disk (MO) and digital versatile disk (DVD), as stated above.

The electronic musical instrument 4A connected to each of the client terminals may be of any other type than a keyboard type, such as a stringed instrument, wind instrument or percussion instrument type. It should also be appreciated that the client terminal in the present invention is not limited to the type where the operator unit, display device, tone generator circuit, etc. are incorporated together within the body of the client terminal, and may be of another type where the operator unit, display device, tone generator circuit, etc. are provided separately from each other but can be connected with each other via MIDI interfaces and communication facilities such as the communication network X. Further, the client terminal may be an automatic performance apparatus such as a karaoke apparatus or player piano.

Figure 3:
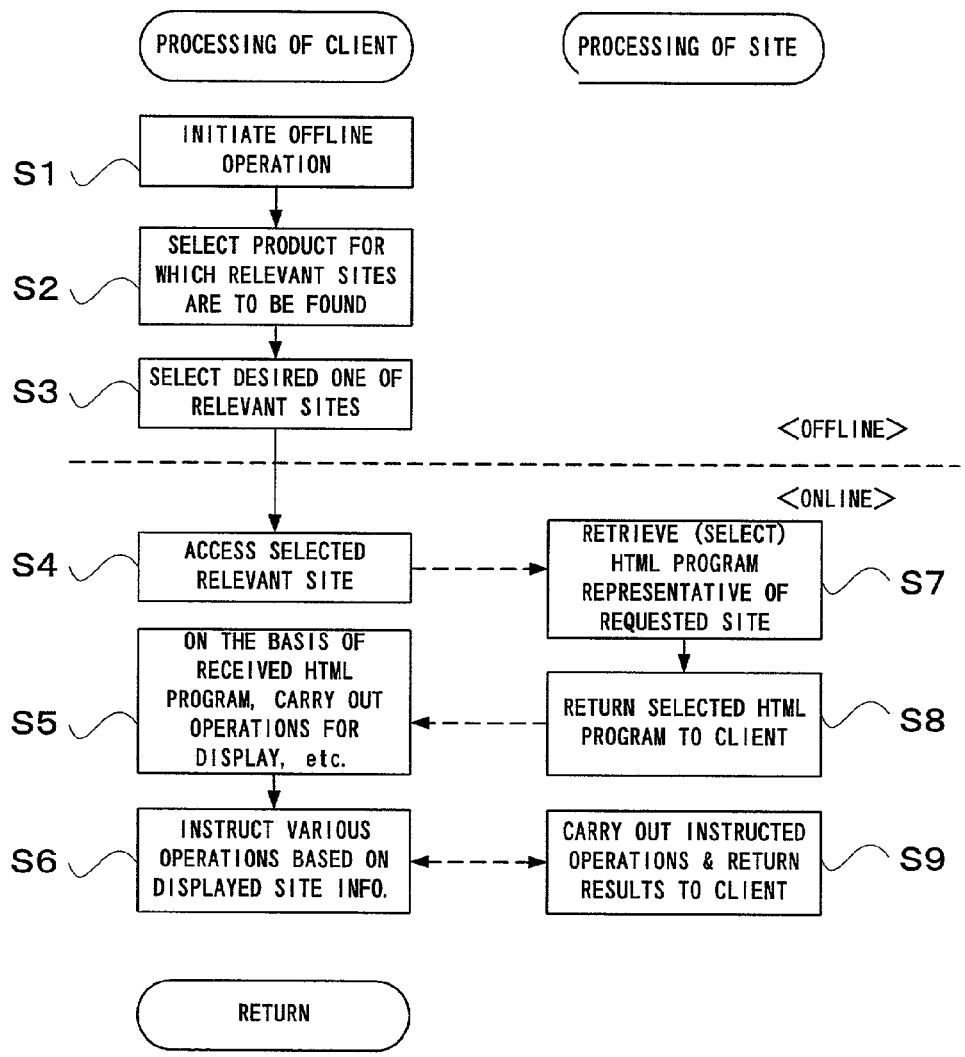
FIG. 3 is a flow chart showing an example of a site search process carried out in the information retrieval system shown in FIG. 1.

FIG. 3 is a flow chart showing an example of a site search process carried out in the information retrieval system of the present invention. Namely, in this figure, there is shown a site search process performed between the client terminal (personal computer terminal PC, portable terminal MT or the like) and the Web server MS. In the illustrated example of FIG. 3, a site related to a product or equipment possessed by a user (e.g., an electronic musical instrument purchased by the user) is searched for by performing two processes in combination: an offline process (i.e., process carried out while the client terminal is not connected to the communication network X such as the Internet); and an online process (i.e., process carried out while the client terminal is connected to the communication network X such as the Internet). Exemplary operational sequence of the site search process is explained below with reference to the flow chart of FIG. 3.

At step S1 of the site search process, the offline process is initiated by the client terminal. Namely, the client terminal starts reading out information from the external storage medium ST on the offline basis, instead of reading out information online from the communication network X such as the Internet. Thus, an HTML program for generating a "product selection screen" is read out from the external storage medium ST, so that the product selection screen is displayed on the display device 6A as will be later described in detail. At next step S2, one of the products listed on the product selection screen, for which related sites are to be found or located, is selected by the user. Once the user thus selects one of the products for which he or she desires to obtain information, an HTML program for generating a "pseudo product site listing screen" of the selected product is read out from the external storage medium ST, and the pseudo product site listing screen is displayed on the display device 6A on the basis of the thus read-out HTML program, as will be later described in detail. At next step S3, the user selects a desired one of the pertinent sites from the displayed pseudo product site screen. Once the user thus selects, from the displayed pseudo product site screen, the desired pertinent site from which product information is to be obtained, an HTML program for generating a "pseudo product site screen" of the selected site is searched for and then read out from the external storage medium ST, so that the pseudo product site screen is displayed on the basis of the read-out HTML program as will be later described in detail. At following step S4, access is made to the selected pertinent site. Namely, at step S4, a URL associated with the displayed pseudo product site screen of the selected site is read out from the external storage medium ST in response to a user's instruction for starting the online process (i.e., user's activation of an access button on the pseudo product site screen), and access is made to the desired site (user-selected site), using the read-out URL, on the communication network X such as the Internet. In this way, the client terminal is connected to the communication network X to shift from the offline state to the online state.

The Web server MS, containing the user-selected site, searches for and selects an HTML program for generating the user-selected site, at step S7. Once the Web server MS has selected such an HTML program, it returns the selected HTML program to the client terminal at step S8. In turn, the client terminal, on the basis of the returned HTML program, carries out various operations such as for displaying a "product site screen" at step S5 as will be later described. Namely, the "pseudo product site screen" on the display device 6A of the client terminal is switched to the "product site screen". Then, at step S6, the client terminal gives the Web server MS an instruction for performing various operations based on the displayed site information (i.e., "product site screen"). If the client terminal requests the Web server MS to perform various operations such as for distributing information, a request for such information is sent from the client terminal to the Web server MS. In turn, the Web server MS carries out the operations as instructed or requested by the client terminal and then returns results of the operations, at step S9. Note that the various operations carried out here include an operation for purchasing only a portion of a musical composition data file. The instant embodiment will be set forth herein in relation to a case where the user has selected a musical-composition-data selling site from which the user can purchase a musical composition data file usable in the equipment (e.g., electronic musical instrument possessed by the user) selected by the user during the above-mentioned offline process. In this musical-composition-data selling site, various operations can be performed, such as a search for purchasable products, listing of the purchasable products and procedure for selling ("purchasing" if stated from the client side) a desired product.

It should be obvious that the above-mentioned online process is performed using software such as an Internet browser.

Figure 4:
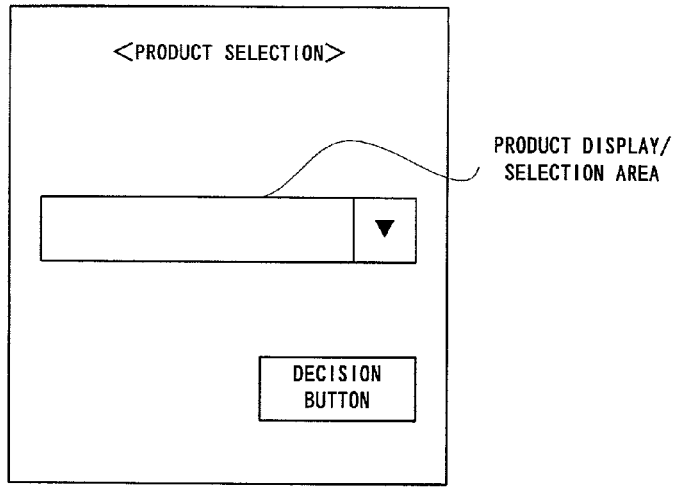
FIG. 4 is a diagram conceptually showing an example of a product selection screen displayed on the client terminal of the information retrieval system.
Figure 5:
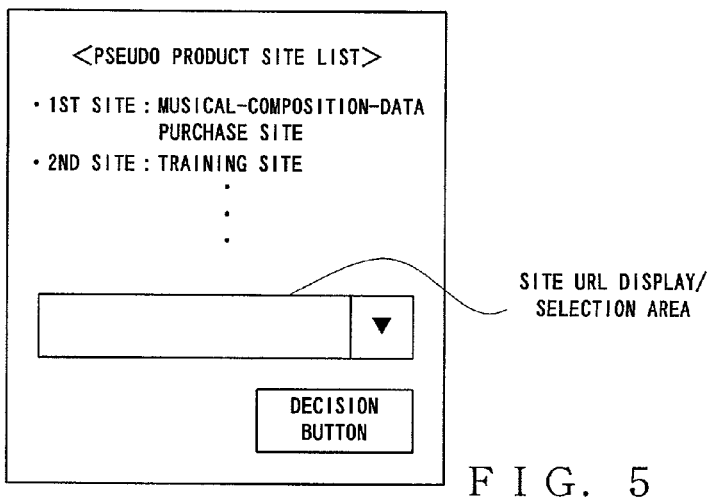
FIG. 5 is a diagram showing an example of a pseudo product site listing screen displayed on the client terminal.
Figure 6:
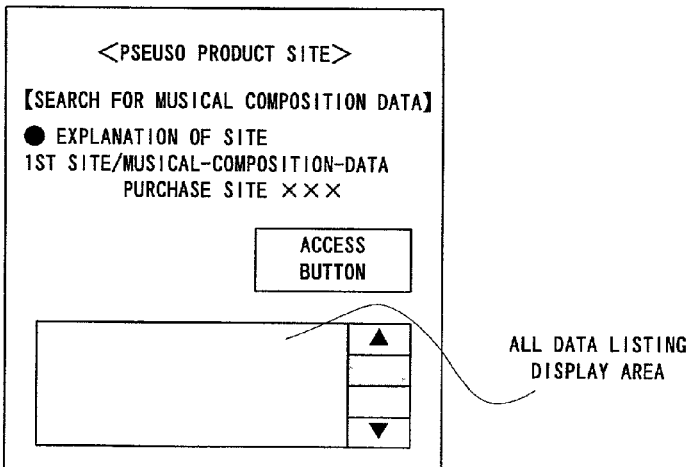
FIG. 6 is a diagram showing an example of a pseudo product site screen displayed on the client terminal.

The following paragraphs describe various screens displayed on the client terminal during the offline process (steps S1 to S3) in the above-described site search process, with reference to FIGS. 4 to 6. These screens are displayed on the client terminal during the offline process (in the illustrated example, the search for sites pertinent to a user-possessed product or equipment) performed using the information read out from the external storage medium ST. The screens shown in FIGS. 4 to 6 are generated on the basis of HTML programs stored in the external storage medium ST; in the external storage medium ST, there are prestored HTML programs for generating the "product selection screen", "pseudo product site listing screen" and "pseudo product site screen". The "pseudo product site listing screen" and "pseudo product site screen" are pseudo site screens provided on a product-by-product basis (e.g., for each type of electronic musical instrument, such as electronic piano or electronic drum), on each of which are shown various pieces or items of information (e.g., information of a newly released product) regarding the electronic musical instrument in question.

FIG. 4 is a diagram conceptually showing an example of the product selection screen, which is an initial screen displayed when a start of the offline process is instructed for searching the external storage medium ST for a site (HTML program) containing information about an user-possessed product or equipment.

As seen in FIG. 4, a "Product Display/Selection" area and "Decision" button are displayed on the product selection screen for the user to select a desired product. In the "Product Display/Selection" area of the product selection screen, there are shown product names etc., and the user can change any one of the product names to be displayed, using a scroll bar (in FIG. 4, denoted in a filled-in-black inverted triangle or scroll arrow) located to the right of the Product Display/Selection area. When the user depresses the Decision button after selecting the name of the user-possessed product from among the product names shown in the Product Display/Selection area, the product selection screen of FIG. 4 is switched to the "pseudo product site listing screen" as shown in FIG. 5. Namely, in response to the user's depression of the Decision button on the product selection screen, an HTML program for generating the pseudo product site listing screen related to the selected product is read out from the external storage medium ST, and the pseudo product site listing screen is displayed on the basis of the thus readout HTML program (see step S2 of FIG. 3).

FIG. 5 is a diagram showing an example of the pseudo product site listing screen, which shows a listing of sites pertinent to the user-possessed product or equipment.

As seen FIG. 5, a "Site URL Display/Selection" area and "Decision" button are displayed on the pseudo product site listing screen, along with contents of a listing of the sites pertinent to the user-possessed product or equipment; in the illustrated example of FIG. 5, a "Musical-Composition-Data purchase site" is shown as a first site, and a "Training" site is shown as a second site. The Site URL Display/Selection area is an area for showing respective URLs of the listed sites, and the user can change any one of the URLs to be displayed, using a scroll bar (in FIG. 5, denoted in a filled-in-black inverted triangle or scroll arrow) located to the right of the Site URL Display/Selection area. When the user depresses the Decision button after selecting the URL of a desired site from among the site URLs shown in the Site URL Display/

Selection area, the pseudo product site listing screen of FIG. 5 is switched to the "pseudo product site screen" related to the selected site as shown in FIG. 6. Namely, in response to the user's depression of the Decision button on the pseudo product site listing screen, an HTML program for generating the pseudo product site screen corresponding to the selected URL is read out from the external storage medium ST, and the pseudo product site screen is displayed on the basis of the thus read-out HTML program (see step S3 of FIG. 3).

FIG. 6 is a diagram showing an example of the pseudo product site screen, which is displayed, on the basis of an HTML program stored in the external storage medium ST, for falsely showing a desired site screen stored in the Web server MS residing on the communication network X.

As seen in FIG. 6, an "Access" button for initiating access to a non-pseudo, or real, site on the communication network X such as the Internet (i.e., the online process) and "All Music Data Listing Display" area are displayed on the pseudo product site screen, along with a detailed explanation of the site (in the illustrated example, the first site selected from the above-mentioned pseudo product site listing screen). The "All Data Listing Display" area is an area for displaying a listing of all the musical composition data files contained in the site. The user can cause all the musical composition data files contained in the site to be displayed, using a scroll bar (in FIG. 6, denoted in a filled-in-black triangle and inverted triangle or scroll arrows) located to the right of the All Data Listing Display area. The pseudo product site screen is constructed similarly to the real site screen on the communication network X with respect to the design (e.g, contents and positions of displayed legends, the number, contents and positions of buttons and display areas, overall color and shape of the site, etc.) and function. When the user depresses the Access button (see step S4 of FIG. 3), access is made to the real site so that the pseudo product site screen is switched to a "product site screen" (see steps S7, S8 and S5 of FIG. 3).

By displaying the "product selection screen" on the basis of the HTML product read out from the external storage medium ST as set forth above, the user is allowed to readily search for information about a desired product or equipment, so that the user can thus quickly access an appropriate pertinent site. Further, because the user is allowed to gain, through the pseudo site screen based on the external storage medium, a knowledge about how to use the real site before actually accessing the real site, the user can promptly use the real site as soon as the site is accessed. Thus, the instant embodiment achieves the benefit that it can effectively enhance user's eagerness or motivation to access a desired site on the communication network. Namely, according to the instant embodiment, the external storage medium ST, such as a CD-ROM, having stored therein the HTML programs for displaying pages substantially similar to those displayed by a desired Internet site is packaged along with the electronic musical instrument EM or other equipment purchased by the user, and the user can use the stored programs in such an external storage medium ST to search for and retrieve a page of information about the purchased electronic musical instrument EM or other equipment on the offline basis, without incurring costs of connection to the communication network. Upon completion of the search for the page from the external storage medium ST, the user can directly access an Internet page corresponding to the retrieved page to thereby gain latest information about the Internet site. Namely, because the page retrieved on the offline basis is designed in the same manner as the page retrieved on the online basis, the user is allowed to previously learn how to use the desired real site on the offline site, so that the user can use the online site smoothly and efficiently.

Further, in the above-described information retrieval system of the present invention, each user can not only search for desired information, data or the like but also obtain or retrieve the searched-for information. Namely, the user can use the client terminal to access a desired WWW site on the communication network X and take desired information from the WWW site into the client terminal for payment or on a charge-free basis (i.e., with or without charge due). For example, when the user desires to listen to a music piece, the user can obtain or purchase a musical composition data file of the desired music piece by accessing a predetermined music site having prestored therein the musical composition data (i.e., musical-composition-data purchase site). Therefore, the following paragraphs describe a data purchase process in relation to a case where a user uses his or her client terminal to access, via the communication network X, a predetermined music site having prestored therein a multiplicity of musical composition data files (i.e., music-piece-data purchase site) and purchase a desired one of the musical composition data files from the musical-composition-data purchase site.

Figure 7:
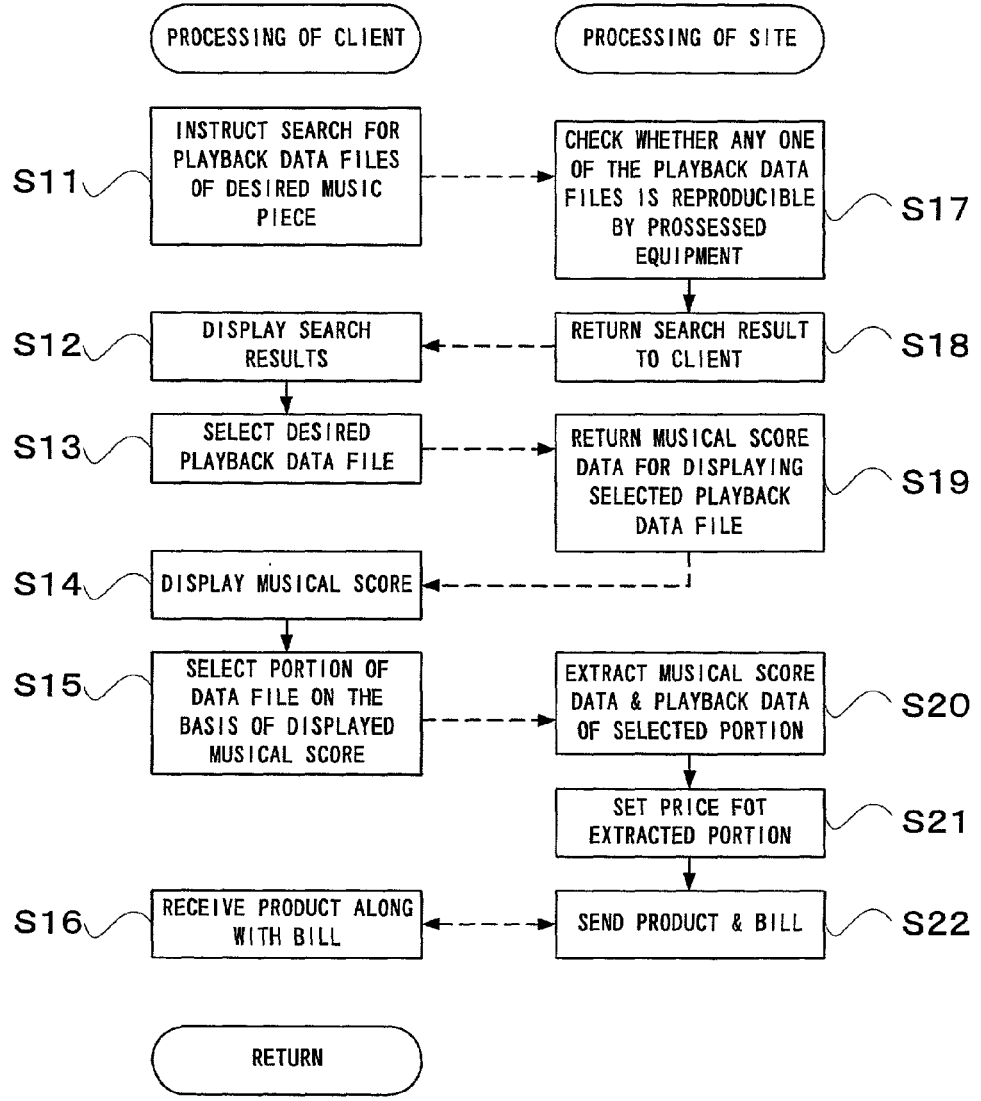
FIG. 7 is a flow chart showing an example of a data purchase process that is carried out by a music-piece-data purchase site in the information retrieval system shown in FIG. 1.

FIG. 7 is a flow chart showing an example of the data purchase process that is carried out by a musical-composition-data purchase site in the information retrieval system of the present invention. The data purchase process is performed between the client terminal, such as the personal computer or portable terminal PC or MT, and the Web server MS after the musical-composition-data purchase site is accessed and the "product site screen" (to be detailed later in relation to FIG. 8) is displayed on the client terminal.

First, at step S11 of FIG. 7, the client terminal sends a request to the Web server MS to instruct the Web server MS, having stored therein a predetermined site, to search for the desired musical composition data. When the client terminal instructs the Web server MS to search for desired playback data, it transmits to the Web server MS a request to search for the playback data. In turn, the Web server (site) MS determines whether or not it has playback data capable of being reproduced by user-possessed equipment, at step S17. Then, the Web server MS returns a result of the search to the client terminal at step S18, which in turn displays the search result at step S12. Namely, in the Web server (site) MS, there are prestored, for each individual music pieces, a plurality of playback data files recorded in a plurality of different formats. Once the user designates the desired music piece on the "product site screen", only the playback data files of the formats reproducible by the electronic musical instrument EM or other equipment possessed by the user are searched for and listed up in a predetermined area of the product site screen. Then, when the user selects a desired one of the playback data files from the listing at step S13, the client terminal requests the Web server MS to distribute the user-selected playback data file. In response to the request from the client terminal, the Web server (site) MS selects one of the prestored playback data files which corresponds to the user-selected playback data file and returns, to the client terminal, a musical score data file for displaying a musical score representing a general organization of the selected playback data file, at step S19. Then, on the basis of the musical score data, the client terminal displays the general organization of the selected playback data file in a predetermined area of a "partial purchase screen" (which will be later described) at step S15. Namely, once the user selects the desired playback data file from among the playback data files of a plurality of formats displayed on the product site screen, the musical score data file corresponding to the selected playback data file is selected by the Wen server MS, so that the musical score data file is sent from the Wen server MS to the client terminal so as to be displayed as a part of the partial purchase screen. In this way, the general organization of the selected playback data file is displayed, for example, in the form of a musical score on the partial purchase screen.

Then, once the user, at step S15, selects a portion of the playback data file displayed on the partial purchase screen which is to be purchased from the site, the client terminal requests the Web server MS to distribute only the user-desired portion of the playback data file. In turn, the terminal requests the Web server MS to extract the play back data and musical score data of the user-desired portion at step S20, and sets a price to be paid by the user for distribution of the playback data of the extracted portion at step S21. In other words, once the user selects the portion to be purchased from the displayed playback data file, only the data of the selected portion (i.e., a partial musical composition data file comprising partial playback data and musical score data) are produced from the playback data file, and a necessary procedure is taken for purchase of the partial playback data file and musical score data corresponding to the partial playback data file. The price of the partial musical composition data file (i.e., playback data and musical score data) is set depending on the length and position of the selected portion in the complete musical composition data file. Namely, the price of the partial musical composition data file is set in accordance with predetermined rules, and the thus-set price of the partial musical composition data file is significantly lower that the price for purchasing the complete or entire musical composition data file. For example, the price of the partial musical composition data file may be set on the basis of a ratio between the length of the partial musical composition data file (i.e., the selection portion) and the length of the complete musical composition data file.

Then, at step S22, the desired product (in this case, partial musical composition data file comprising the extracted playback data and musical score data) is sent to the client terminal along with a bill showing the price to be paid. In turn, the client terminal receives the product (partial musical composition data file) after performing a billing operation to the user, at step S16. Namely, once the user has performed the predetermined operation for purchasing a desired product (partial musical composition data file) on the client terminal, the Web server (site) MS sets the price of the user-desired product (partial musical composition data file), and the client terminal is requested to input necessary payment information for the purchase of the product. The price is charged to the user on the basis of the input information. In response to the billing operation by the client terminal, the Web server MS sends the product to the client terminal. The payment information for the purchase of the product may be a credit card number if the user wants to pay by a credit card, an address to which a necessary document is to be transmitted if the user wants to pay by bank account transfer or postal transfer, or user information for using electronic money if the user wants to pay by electronic money. The purchased product may be delivered by way of the communication network if the delivery is effected after the payment (as in the case where the payment is by a credit card or electronic money), delivered in recorded form on a predetermined storage medium, such as a CD-ROM or DVD, if the delivery is effected before the payment (as in the case where the payment is by bank account transfer or postal transfer).

Figure 8:
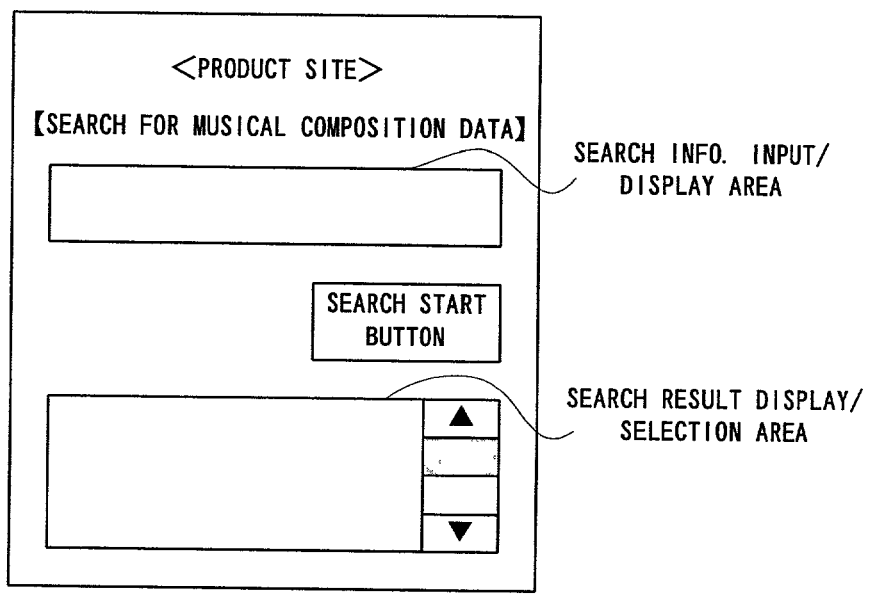
FIG. 8 is a diagram conceptually showing an example of a product site screen displayed on the client terminal.
Figure 9:
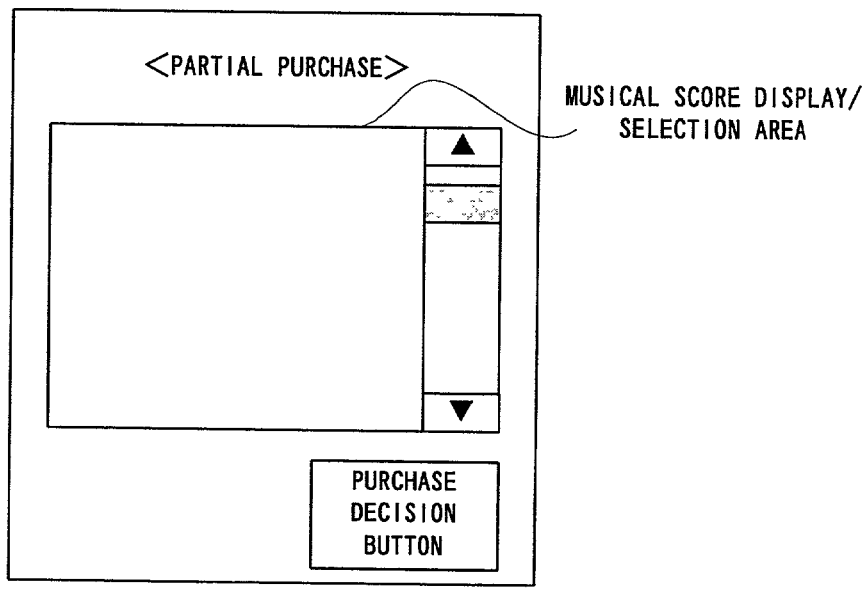
FIG. 9 is a diagram conceptually showing an example of a partial purchase screen displayed on the client terminal.

Now, a detailed description will be about the above-mentioned "product site screen" and "partial purchase screen", with reference to FIGS. 8 and 9. Specifically, FIG. 8 is a diagram conceptually showing an example of the product site screen, which is displayed on the basis of an HTML program read out from the Web server (site) MS in accordance with an URL transmitted from the client terminal.

As seen in FIG. 8, the "product site screen" is substantially similar in design and function to the "pseudo product site screen" of FIG. 6 displayed on the basis of the corresponding HTML program stored in the external storage medium ST. When search conditions of a userdesired musical composition data file (e.g., the name and genre of the music piece, name of a singer singing the music piece, etc.) are input into a "Search Information Input/Display" area and a "Search Start" button is activated on the product site screen, a listing of searched-for musical composition data files is shown in a "Search Result Display/Selection" area. Namely, the Search Result Display/Selection area is an area for displaying all the musical composition data files of formats reproducible by the electronic musical instrument EM or other equipment possessed by the user (see step S12 of FIG. 7). The user can cause all the searched-for musical composition data files to be sequentially displayed using a scroll bar (in FIG. 8, denoted in a filled-in-black triangle and inverted triangle or scroll arrows) located to the right of the Search Result Display/Selection area. In response to activation of the Search Start button, a search is made, through musical composition data files recorded in various formats, for musical composition data files satisfying the search conditions having been entered in the "Search Information Input/Display area (e.g., musical composition data files reproducible by the user-possessed equipment such as the electronic musical instrument EM), and the thus searched-for musical composition data files are listed up in the "Search Result Display/Selection" area. Once the user selects one of the musical composition data files listed up in the Search Result Display/Selection area, the product site screen of FIG. 8 is switched to the partial purchase screen of FIG. 9 (see steps S13, S19 and S14 of FIG. 7).

FIG. 9 is a diagram conceptually showing an example of the partial purchase screen, which is displayed on the basis of the corresponding HTML program read out from the Web server (site) MS in accordance with the URL transmitted from the client terminal. The partial purchase screen has a "Music Piece Display/Selection" area where a general organization of the selected musical composition data file is shown.

In the Music Piece Display/Selection area of the partial purchase screen, the general organization of the selected musical composition data file is shown, for example, in the form of a musical score. If the user depresses or activates a "Purchase Decision" button after selecting, from the displayed musical score, a portion of the musical composition data file for which the user wants to obtain musical composition data, the user can purchase the musical composition data only of that selected portion (see steps S15, S20 to S22 and S16 of FIG. 7). Process for purchasing the musical composition data of the selected portion is described more fully with reference to FIGS. 10 and 11.

Figure 10:
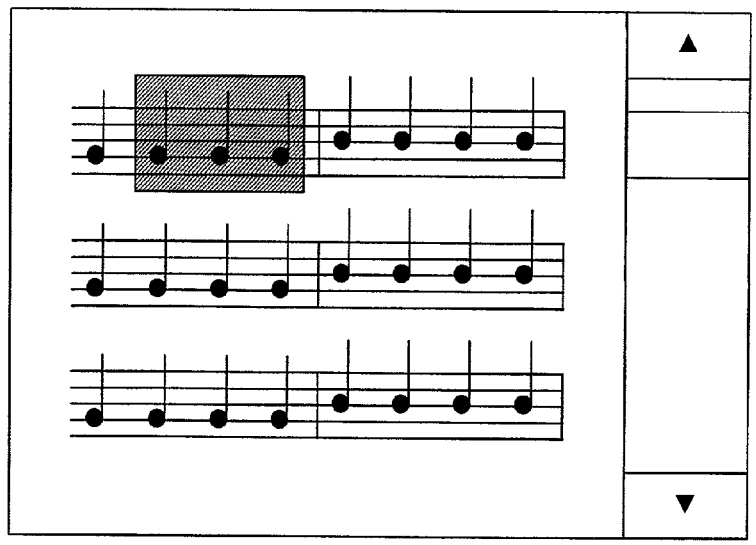
FIG. 10 is a diagram showing an example of a music piece display/selection area of the partial purchase screen of FIG. 9 having a musical score displayed therein.
Figure 11:
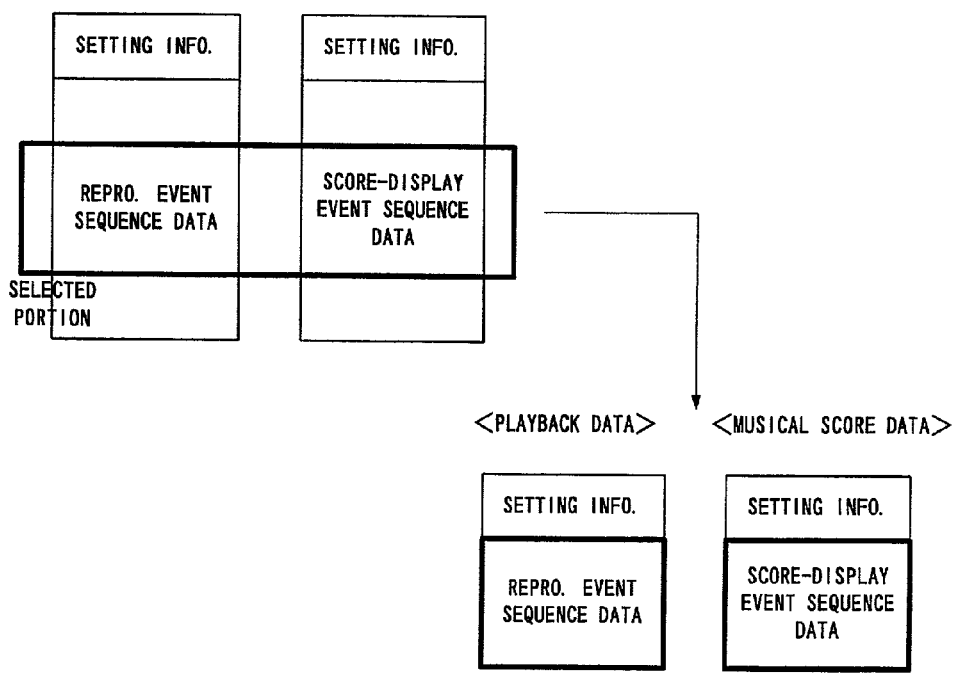
FIG. 11 is a conceptual diagram of an example of musical composition data generated by a Web server (site) in accordance with an instruction from the client terminal.

FIG. 10 is a diagram showing an example of the Music Piece Display/Selection area of the partial purchase screen having the musical score of the musical composition data file displayed therein. FIG. 11 is a conceptual diagram of an example of musical composition data generated by the Web server MS in accordance with an instruction from the client terminal.

As seen in FIG. 10, the musical score of the complete musical composition data file is displayed in the Music Piece Display/Selection area in a predetermined form where the musical score is divided every predetermined unit; in the illustrated example, the musical score is divided every two measures. The user can cause a portion of the musical score, corresponding to a desired portion of the musical composition data file, to be displayed by vertically moving a scroll bar (in FIGS. 9 and 10, denoted in a filled-in-black triangle and inverted triangle or scroll arrows) located to the right of the Music Piece Display/Selection area. With the portion of the musical score thus displayed, the user can select the desired portion of the musical composition data file by use of the mouse or the like, as shown by a rectangular hatched block in halftone in FIG. 10. Once the user activates the Purchase Decision button after having thus selected the desired portion of the musical composition data file (see step S15 of FIG. 7), a partial musical composition data file, i.e. a set of playback data and musical score data, corresponding to the selected portion is produced (see step S20 of FIG. 7).

As seen in FIG. 11, each musical composition data file in the instant embodiment comprises a set of playback data and musical score data. The playback data are data of an SMF (Standard MIDI File) for automatically performing the music piece in question, which comprise setting information and reproduction event sequence data. The musical score data comprise setting information and score-display event sequence data. These playback data and musical score data themselves are not novel and will not be described in detail here. The partial musical composition data file corresponding to the user-selected portion is produced by extracting musical composition data corresponding to the selected portion from the playback data and musical score data of the entire music piece and re-organizing the extracted data into a partial musical composition data file (i.e., a set of playback data and musical score data). Namely, the partial musical composition data file corresponding only to the portion to be purchased (i.e., portion enclosed by a thick line frame in FIG. 11) is produced by extracting data of the to-be-purchased portion from the complete musical composition data file. The setting information of the thus-produced partial musical composition data file is produced in accordance with that of the complete musical composition data file. More specifically, the setting information of the complete musical composition data file is copied to the partial musical composition data file, to which is added further information indicative of order etc. of the individual ones of the partial musical composition data in the complete musical composition data file. For example, a tone color number and tempo value indicative of a tone color and tempo, respectively, to be used in reproduction of the partial musical composition data file are copied from the setting information of the complete musical composition data file, while a measure length indicative of the number of measures in the partial musical composition data file and connection information indicative of a way of interconnecting the partial musical composition data file and another partial musical composition data file to be reproduced next are added as new setting information.

With the above-described arrangements of the instant embodiment, the user is allowed to purchase only a desired portion of the product (in this case, musical composition data file), which achieves efficient purchase or acquisition of the data. Namely, according to the instant embodiment, once the user selects data of only a desired portion, the Web server (site) MS automatically produces a partial data file with the portion unnecessary for the user removed therefrom and then transmits the thus-produced partial data file to the user, so that the user can purchase only the partial data file without having to purchase the complete data file. Therefore, the user can purchase the desired data at a lower price than when purchasing the complete data file (i.e., the complete set of the data).

Further, because only the partial data file is transmitted from the Web server MS to the client terminal, the necessary data transmission time can be significantly reduced here as compared to the case where the complete data file is transmitted, which achieves an enhanced data transmission efficiency.

Note that the displayed information at the time of the partial purchase (i.e., display in the Music Piece Display/Selection area of the partial purchase screen) may be other than a musical score, as long as the display allows the user to appreciate a general organization of a music piece in question and select a desired portion of the music piece from the display.

Further, whereas the embodiment has been described above in relation to the case where the musical composition data file to be purchased comprises a set of playback data and musical score data, only either one of the playback data and musical score data may be purchased. Namely, the musical composition data file to be purchased may comprise either or both of the playback data and musical score data.

It should also be appreciated that the information stored in the external storage medium may be prestored in the client terminal, such as in the user-purchased electronic musical instrument or portable terminal, in which case information obtained from the Web server can be used directly in the client terminal by the client terminal being connected directly to the Internet or other communication network.

It should be appreciated that the musical composition data (specifically, reproduction event sequence data or score-display event sequence data) may be in any desired format, such as: the "event plus absolute time" format where the time of occurrence of each event is represented by an absolute time within the music piece or a measure thereof; the "event plus relative time" format where the time of occurrence of each event is represented by a time length from the immediately preceding event; the "pitch (rest) plus note length" format where each musical composition data is represented by a pitch and length of a note or a rest and a length of the rest; or the "solid" format where a memory region is reserved for each minimum resolution of a performance and each performance event is stored in one of the memory regions that corresponds to the time of occurrence of the performance event.

In the case of musical composition data for a plurality of channels, the musical composition data for the channels may be stored in a mixed format, or the musical composition data for each channel may be stored on a separate track.

According to the above-described embodiment, an external storage medium, such as a CD-ROM, having stored therein HTML programs capable of displaying pages substantially similar in contents to those of predetermined WWW sites is packaged along with a user-purchased product or equipment such as an electronic musical instrument, so that a user can use the external storage medium to retrieve from the medium a Web page related to the user-purchased product or equipment and directly access a real Wen page on the Internet or other communication network corresponding to the searched-for Web page. Namely, the Web page searched for and retrieved on the offline basis is similar in design and structure to the Web page searched for and retrieved on the online basis, and thus the offline Web page allows the user to learn in advance how to use the WWW site. As a result, the user can promptly use the actual Web page on the online basis smoothly and efficiently shortly after the access. Further, because the user can purchase only partial data of a desired portion created and transmitted by the Web server, the user can obtain the desired data with enhanced efficiency.

The following pages outline a computer program, recording medium, apparatus and method according to a second embodiment of the present invention.

The computer-readable storage medium contains a file for use in a product order method in which a user proceeds from a product-specifying screen to a procedure for ordering the product when the user desires to order the product by accessing a server on a network. The file includes a plurality of items of specifying information each specifying one of a limited plurality of items that are among all items capable of being supplied by the server, and a plurality of items of display information each indicative of a display object or visual content, related to one of the items of specifying information, that shows one of the limited plurality of items. Each of the items of specifying information and display information is described in a hyperlink-enabling format, and each of the items of specifying information and/or a visual presentation of the display object or content are linked with an address of the product-specifying screen in the server.

Thus, using the file recorded in the storage medium when ordering a desired product, the user is allowed to appropriately select the product before accessing the server, so that the desired product can be ordered promptly as soon as the client accesses the server. Such arrangements can greatly simplify the process or procedure for ordering the product and reduce the total time of connection to the network. Further, because a desired product is selected from the limited number of products that are among all the products handled by the server, it becomes easier for the user to select a product just suited to the user. Note that the storage medium may be in the form of a read-only medium, such as a CD-ROM, or a hard disk incorporated in a computer.

In the storage medium, each of the related display objects or contents has a plurality of different display modes each indicative of a characteristic of the product specified by one of the items of specifying information, and each of the items of specifying information is allocated at least one such related display object or contents having one of the different display modes. The information of the display object is described in the file in the hyperlink-enabling format, and a visual presentation of the display object or contents for the network search is linked with the address of the product-specifying screen. Because the user can know characteristics of each product from the display mode of the related display object, it becomes easier for the user to select a product just suited to the user.

In one implementation, information of a display object or contents for a network search is described in the file in the hyperlink-enabling format, and a visual presentation of the display object for the network search is linked with an address of a screen for effecting the network search. Thus, a network search for products not described in the file can be greatly facilitated.

In another implementation, further information indicative of a display object for a version upgrade is described in the file in the hyperlink-enabling format, and a visual presentation of the display object for the version upgrade is linked with an address for downloading updated contents of the file. Thus, when the contents of the file become old or out of data, the user can readily access the network to obtain the updated version of the file whenever necessary.

The method according to the embodiment is designed as a product order method in which a user proceeds from a product-specifying screen to a procedure for ordering the product when the user desires to order the product by accessing a server on a network a user to access a server on a network to order a product from the server, which comprises: a step of reading out a predetermined file from such a storage medium as discussed above; causing items of specifying information and/or display objects to be displayed on a display device; allowing the user to select one of the items of specifying information and/or the display objects displayed on the display device; and requesting the server to supply a screen of an address linked with the selected item of specifying information and/or the display object and then causing the display device to display a screen for ordering a product corresponding to the selected item of specifying information and/or the display object from the server. After the ordering screen is displayed, a procedure for ordering the product via the screen is carried out by accessing the server via the network. In another implementation, this product order method may be described in a program for execution by a computer, and the invention may be practiced as a storage medium storing such a program.

Further, the apparatus according to the second embodiment of the present invention is designed as an apparatus via which a user proceeds from a product-specifying screen to a procedure for ordering a product by accessing a server on a network, and which comprises: such a storage medium as discussed above, a readout section for reading out a predetermined file from the storage medium; a display control section for causing items of specifying information and/or related display objects to be displayed on a screen; an input/output section for allowing a selection of the displayed items of specifying information and/or related display objects; and a hyperlink control section for requesting the server to supply a screen of an address linked with the selected item of specifying information and/or display object and then displaying a screen for ordering a product corresponding to the selected item of specifying information and/or display object from the server, so as to allow the user to go forward with a procedure for ordering the product through the ordering screen by accessing the server via the network.

Furthermore, a storage medium in accordance with the embodiment stores therein a file for use in a product order method in which a user proceeds from a product-specifying screen to a procedure for ordering the product when the user desires to order the product by accessing a server on a network. A plurality of items of specifying information each specifying one of a plurality of products and a plurality of items of display information each indicative of a related display object are each described in the file in a hyperlink-enabling format. The related display objects have at least first and second display modes, and each of the items of specifying information is allocated at least one of the related display objects which has one of the first and second display modes. Each of the items of specifying information allocated the related display object having the first display mode specifies one of a limited plurality of products that are among all products capable of being ordered by accessing the server. Visual presentation of the related display object having the first display mode is linked with an address of the product-specifying screen that shows the product specified by the item of specifying information corresponding to the related display object. Visual presentation of the related display object having the second display mode is linked with a particular directory in the storage medium, and the product specified by the specifying information allocated the related display object having the second display mode is recorded under the particular directory.

The second embodiment of the present invention will be described more fully with reference to the accompanying drawings.

Figure 12:
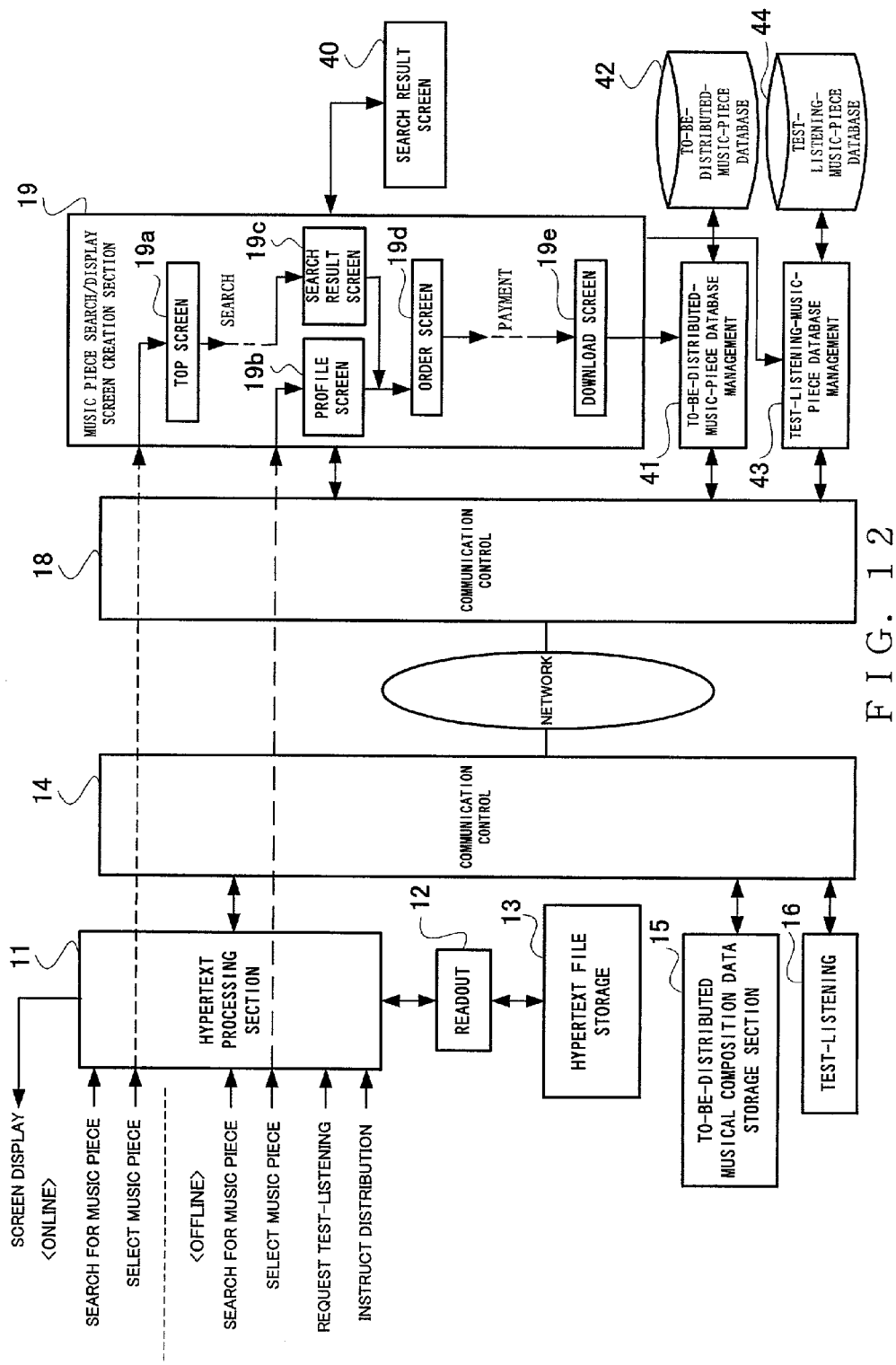
FIG. 12 is a block diagram showing a general setup of a musical composition data distribution system, which is explanatory of a second embodiment of the present invention.

FIG. 12 is a block diagram showing a general setup of a musical composition data distribution system, which is explanatory of the second embodiment of the present invention. The second embodiment is designed in such a manner that when a desired musical composition data file is to be searched for and downloaded from among a plurality of musical composition data files accumulated or stored in a distribution server residing in a musical composition data distribution site, the embodiment allows a selection of the desired musical composition data file on the offline basis, i.e. without connection to a communication network.

In FIG. 12, the musical composition data distribution system includes a hypertext processing section 11, a readout section 12, and a hypertext file storage section 13. Reference numeral 14 represents a communication control section 14 which connects to a distribution server via the communication network X. Reference numeral 15 a to-be-distributed musical composition data storage section, and 16 a test-listening section. The functions of these components are incorporated in a personal computer (corresponding, for example, to the personal computer 102 of FIG. 23) of a client.

The musical composition data distribution system further includes a communication control section 18, a music piece search/display screen creation section 19, a display-screen creating data storage section 40, a to-be-distributed-music-piece database management section 41, a to-be-distributed-music-piece database 42, a test-listening-music-piece database management section 43, and a test-listening-music-piece database 44. The functions of these components are functionally incorporated in a music-piece-data distribution server.

Hypertext is a text document to be used on a Web page in a WWW (World Wide Web) system. The hypertext document contains linked document structures by defining links, to other data, of text data, still picture data, moving picture (animation) data, sound data, etc. in the document. The hypertext document also has a hyperlink function for interlinking remote hypertexts via a communication network. In the HTML (HyperText Markup Language), each hypertext document is designated by a combination of tags "<AHREF>" (URL of a link destination) and "</A>".

The "URL" (Uniform Resource Locator) comprises a character string specifying a way (protocol name) for accessing an information resource on the Internet and a kind of address of the information resource which represents, by a hierarchical structure, a path and search part blow the server name. By designating a link destination using such a URL, a hyperlink can be established in the information resource possessed by the server. At the lowermost level of the URL, there are mentioned, for example, a program name and variable of a CGI (Common Gateway Interface), which may, however, vary depending on the software of the sever.

The hypertext file storage section 13 is a local storage section of the client, which has stored therein a listing of music pieces described in the hypertext format. The hypertext file storage section 13 may be in the form of a dedicated CD-ROM. The hypertext format may be the above-mentioned HTML, XML (Extensible Markup Language), PDF (Portable Document Format), or the like. In the instant embodiment, the listing of music pieces is in the PDF. PDF file may be created simply such as by opening an HTML file by use of "Acrobat" (registered trademark of Adobe Systems Inc.) and storing the HTML file as a PDF file. The PDF file is a document file that can be read by "Acrobat" or "Acrobat Reader", displayed on a screen in a very similar manner to a printed paper and imparted with page numbers, and the PDF file also permits a search therethrough for a desired text.

The listing of music pieces lists types of data usable by particular types of electronic musical instruments, tone generators, etc. and a plurality of musical composition data files suited to the types of electronic musical instruments, along with titles and names of the musical composition data files, artists, composers, lyric writers, etc. of the music pieces. Namely, this listing of music pieces is organized similarly to a karaoke songbook, so that any user can readily search for a desired music piece even though a great many music pieces are listed. Each of the music pieces in the listing is linked to an URL of a music-piece-data specifying profile screen 19b that is included in a music piece search/display scree creation section 9 of the distribution server. The distribution server is requested to transmit the profile screen 19b to the client. The URL of the profile screen 19b is imparted with a unique number (ID or file name) corresponding to the musical composition data file.

The readout section 12 of the client reads out the listing of music pieces from the hypertext file storage section 13 and passes the thus read-out listing to the hypertext processing section 11. The hypertext processing section 11 visually shows, on a screen of a display device, the listing of music pieces described in the hypertext format, in accordance with screen control information contained in the text.

The user can search for a desired music piece while viewing the plurality of music pieces shown on the display screen. Clicking on a predetermined point on the screen can ultimately select the desired music piece, and a URL of a link destination associated with the selected music piece is transmitted via the communication control section 14 to the communication network X. The thus-transmitted URL is the URL of the music-piece-data specifying profile screen 19b.

Like its conventional counterparts, the hypertext processing section 11, via the communication control section 14, communication network X and communication control section 18, sends requests for test listening and data distribution, instruction for online music piece selection, etc. to the music piece search/display screen creation section 19 of the distribution server. Note that although not described here, there may be provided a billing server (corresponding to the billing process server 103 of FIG. 23) in the system.

The music piece search/display screen creation section 19 of the distribution server searches for the user-desired music piece using a hypertext display screen. The music piece search/display screen creation section 19 also has a function of creating a display screen, using screen-constituting materials such as data from the display-screen creating data storage section 40 and all musical composition data stored in the to-be-distributed-music-piece database 42. For example, the music piece search/display screen creation section 19 first accesses a top page screen 19a, then proceeds to a search result screen upon completion of the search, and then jumps to an order screen 19d. Note that the section 19 may jump to the profile screen 19b, or the order screen 19d may also has the function of the profile screen 19b.

Then, a billing/payment operation is performed by the billing server (corresponding to the billing process server 103 of FIG. 23), and upon completion of the billing/payment operation, the music piece search/display screen creation section 19 proceeds to a download screen 19e. Then, the to-be-distributed-music-piece database management section 41 retrieves the musical composition data file of the selected music piece from the to-be-distributed-music-piece database 42, and causes the thus-retrieved musical composition data file to be downloaded to the to-be-distributed musical composition data storage section 15 of the client via the communication control section 18 of the server, communication network X and communication control section 14 of the client.

In case a "Test-listening" button on the display screen is clicked during the music piece search, the test-listening-music-piece database management section 43 is activated to retrieve a selected test-listening musical composition data file. The management section 43 transmits the thus-retrieved test-listening musical composition data file to a cache memory of the test-listening section 16 via the communication control section 18 of the server, communication network X and communication control section 14 of the client, so that the test-listening musical composition data file is performed by the test-listening section 16.

In the illustrated example of FIG. 12, the functions of the communication control section 14 and hypertext processing section 11 are implemented by WWW browser software running under an operating system of the personal computer. Each hypertext file in the instant embodiment is in the PDF format. Thus, the personal computer has installed therein the above-mentioned "Acrobat" or "Acrobat Reader" as well as the WWW browser software. The above-mentioned listing of music pieces has a small file size because it is prepared by extracting and editing only names of musical composition data that are suited to particular types of equipment or the like. The test-listening section 16 can be implemented by installing the software "Mid Radio" player (trademark of Yamaha Corporation).

Whereas the display-screen creating data storage section 40, to-be-distributed-music-piece database 42 and test-listening-music-piece database 44 are shown in FIG. 12 as separate storage devices, these components may be integrated into a single database. The test-listening musical composition data may be created by processing the musical composition data read out from the to-be-distributed-music-piece database 42. Further, the above-mentioned databases may be provided in separate servers, and these separate servers may be caused to cooperate with each other via the communication network X.

The server may be a WWW server, and the functions of the music piece search/display screen creation section 19, to-be-distributed-music-piece database management section 41 and test-listening-music-piece database management section 43 may be performed by use of the common gateway interface (CGI).

The following paragraphs describe exemplary manners in which the listing of music pieces in the hypertext file storage section 13 is organized and used in the instant embodiment.

Names of musical composition data files suited to particular type of equipment are previously extracted from the musical composition data files stored in the distribution server, to create the listing of music pieces in a hypertext file format. The thus-created listing of music pieces is prestored into CD-ROMs or other storage media suitable for distribution to users. This hypertext file may be supplied to users by being attached to particular types of electronic musical instruments or tone generator devices, or by being downloaded from a server apparatus on the communication network. The hypertext file may be installed in hard magnetic disks of a personal computers, rather than in CD-ROMS. Note that the hypertext file may be in the form of a PDF file or HTML (language usable for Web page creation) file, as noted earlier. In this case too, the listing of music pieces may be arranged into an at-a-glace layout.

Each user can use his or her personal computer to read out a predetermined file stored in the CD-ROM and thereby searches the read-out predetermined file for the name of a desired musical composition data file on the offline basis. In response to user's selection of the name of the desired musical composition data file to be downloaded, the WWW browser software is automatically activated and connected to the Internet, so that the user can access the URL of the hyper-linked profile screen 19*b*. Clicking on a predetermined point of this profile screen 19*b* can cause the user to jump to the order screen of the specified musical composition data file. Note that the WWW browser software may be activated and connected to the Internet prior to clicking on the predetermined point of this profile screen 19*b*.

In a situation where the downloaded musical composition data file is used in an electronic musical instrument, it is first downloaded to the personal computer and then loaded, via a removable-type storage medium or MIDI or other serial interface, to the electronic musical instrument.

Figure 13:
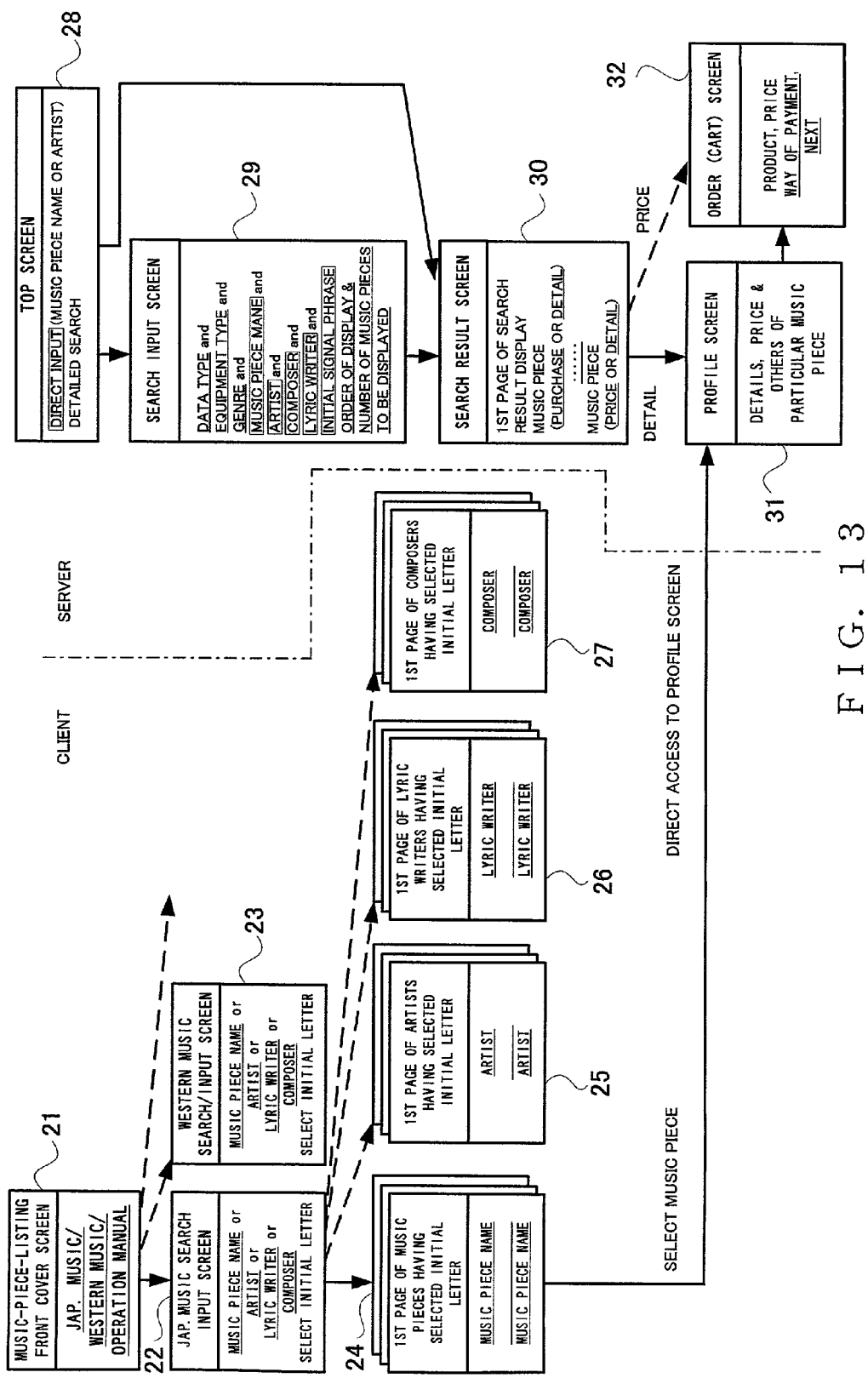
FIG. 13 is a block diagram explanatory of a link structure of a screen of a music piece listing stored in a hyper text file storage section shown in FIG. 12, and a link structure of a hyper text screen created and transmitted by a music piece search/display screen creation section of FIG. 12.

FIG. 13 is a block diagram explanatory of a link structure of the screen of the music piece listing stored in the hyper text file storage section 13 shown in FIG. 12, and a link structure of the hyper text screen created and transmitted by the music piece search/display screen creation section 19 of FIG. 12. Details of some of the display screens shown in this figure are also shown in FIGS. 14 to 18.

In the illustrated example of FIG. 13, each of underlined items is an item that can be selected by being merely clicked, or an item from which a drop-down list box containing a plurality of choices is displayed. Further, each of items enclosed within a rectangular box is an item typed in by the user. Clicking on this display object or other display object related thereto, or a display object indicative of progression, the client jumps to a next display screen in accordance with items associated with the display and entered into the text box.

Top page of the music piece listing stored in the hypertext file storage section 13 of the client terminal is a music-piece-listing front cover screen 21. By clicking any one of displayed items, Japanese music menu, western music menu and operation manual on the music-piece-listing front cover screen 21 (FIG. 22), the user can jump to a Japanese music search/input screen 22, western music search/input screen 23 or operation manual screen (not shown).

On the Japanese music search/input screen 22, there is shown the Japanese syllabary or Japanese alphabet for the user to specify a name, artist, lyric writer and/or composer of a desired Japanese music piece. By clicking a list of initial letters of any one of the categories (i.e., name, artist, lyric writer and composer), the can user proceed to a next stage. The western music search/input screen 23 is similar to the Japanese music search/input screen 22 except that tables of numerals and English alphabet are shown in place of the Japanese syllabary or Japanese alphabet.

When the initial letter has been selected from the Japanese syllabary for the category of music piece names, the process proceeds to a first music piece listing page 24 (FIG. 14), of a plurality of pages arranged in the alphabetical order of music piece names, which shows music pieces with names having the selected initial letter. On the music piece listing page 24, sets of the music piece names and other relevant information are shown with each of the sets lying in a row (horizontal direction) on the page 24.

By clicking a desired one of the music piece names or Selection button related thereto, the user can proceed to the profile screen 31 (FIG. 18) of the distribution server liked with the clicked desired music piece name. Then, once the user clicks an indication of "Price" (in the illustrated example of FIG. 18, ¥200) below "Purchase (to Cart)" on the profile screen 31, the profile screen 31 jumps to an order screen 32.

When the initial letter has been selected from the Japanese syllabary for any one of the categories, artists, lyric writers and composers, on the Japanese music search/input screen 22, the screen 22 jumps to a first page 25-27, of a plurality of pages arranged in the alphabetical order for that category, which shows names having the selected initial letter.

The whole of the above-mentioned music piece listing may be formed as a single PDF file, rather than a plurality of separate PDF files for hierarchical links to lower level pages via a link function. Where the whole of the music piece listing is written in a single PDF file, or where orders of the music piece names, artist names, lyric writer names and composer names are each written in a single PDF file, a desired page may be searched for and retrieved by designation of the desired page.

On the other hand, the display screens created by the music piece search/display screen creation section 19 and transmitted from the distribution server to the client terminal each begins with the top page screen 28 (FIG. 15) of the distribution server. The user directly inputs the music piece name or artist name into a text box on the top page screen 28, so that the top page screen 28 is caused to jump to a search result screen 30 (FIG. 17). Normally, the user clicks a "Detailed Search" button on the search result screen 30 so as to jump to a search/input screen 29 (FIG. 16A).

On the search/input screen 29, the user enters any of the type of data, type of equipment, and genre, name, artist, composer, lyric writer and initial singing phrase of the music piece. If the user has selected a plurality of these items, the search is conducted under AND conditions. Note that "Order of Display" and "Number of Music Pieces to be Displayed" (in the illustrated example, this number is shown as "10") are items for selecting display conditions of the search results. Reference numeral 30 represents a search result screen (see FIG. 17). Clicking an indication of "Price" (in the illustrated example, ¥200), below "Cart", related to any one of the music piece names can cause the screen to jump to the order screen 32. Clicking a "Detail" button related to any one of the music piece names can cause the screen to jump to the profile screen 31.

On the profile screen 31 (see FIG. 18), there is shown only one title of musical composition. The term "title of musical composition" is used here to distinguish from the term "music piece name", because there may be music pieces which have a same music piece name but are composed by different composers or the like. However, even for a same music piece name, there may exit a plurality of different musical composition data files that differ in any of the artist (singer or instrument performer), type of the musical composition data, type of the equipment used, etc. In such a case, one of the musical compositions being currently searched for is indicated by a predetermined search mark on the profile screen 31. Profile screens 31 differing in the sort of the search mark are treated as different profile screens 31, even though other display objects or contents are the same among the screens 31. Namely, a number unique to each of the musical composition data files, added as a variable to the URL of the profile screen 31, differs from such a number of any other profile screen 31.

If the type of the equipment used, type of the musical composition data and artist have been set by the user as search conditions on the search screen, or if an offline search has been conducted through a music piece listing, one of the titles of composition most closely fitting the search conditions is imparted with the search mark. Note that clicking one of the titles of musical compositions which has not been selected by the user can switch the musical composition data file to be retrieved to another.

Once the indication of "Price" (in the illustrated example, "¥200") button is clicked on the profile screen 31, the user can jump to the order screen 32. On the order screen 32, there are shown the name, price, etc. of the selected product, as well as buttons "Cancel Purchase", "Next Step", "Re-display", "Purchase Other Product" and the like. As the user purchases a plurality of musical composition data files one after another, the number of products displayed on this order screen 32 increases.

FIGS. 14 to 17 are additionally explained below. FIG. 14 shows one specific example of the music piece listing page 24 corresponding to the initial letter of a selected one of the music piece names listed in the alphabetical order. In the halftone blocks of each horizontal row, there are mentioned a specific title, artist, composer and lyric writer of the music piece. Note that some of the items extend across several rows. Moving a pointer to one of "Access" buttons, corresponding to a particular one of the music pieces, at the right end of the music piece listing page 24 to click the Access button via a mouse, the particular music piece can be selected so that the user can jump to a link destination of the selected music piece. Also shown on this music piece listing page 24 are filled-in black triangular marks or arrows for links to a Japanese music menu, top page screen, previous page and next page.

FIG. 15 is a specific example of the top page screen 28. On the top page screen 28, various items are displayed, of which only items related to inputs for searching a music piece are shown in FIG. 15. The user can jump from the top page screen 28 to the research result screen 30 of FIG. 13 by clicking a white, circular radio button, entering the name of a desired music piece or artist, and then clicking a "GO!" button on the top page screen 28. Clicking a "Detailed Search" button can cause the user to jump to the search input screen 29 of FIG. 13.

FIGS. 16A to 16D show one specific example of the search input screen 29 shown in FIG. 13. FIG. 16A is a general view of the search input screen 29, and FIG. 16B shows options displayed when a triangular button of any one of list boxes of the search input screen 29 is clicked.

FIG. 17 is a diagram showing one specific example of the search result screen 30 of FIG. 13. Search conditions as entered on the search input screen 29 are shown in an upper half portion of the search result screen 30, and clicking a "Search" button causes a re-search to be initiated. In a lower half portion of the search result screen 30, there is shown a listing of musical compositions satisfying the entered search conditions with each horizontal row corresponding to one musical composition. Each horizontal row consists of a check box, "Test-listening" button, title of musical composition, artist, first or initial singing phrase, type of data, "Price" (in the illustrated example, ¥200) button, and "Detail" button. The user can test-listen to the musical composition by clicking the Test-listening button, and test-listen to the musical composition a plurality of times in succession.

FIG. 18 is a diagram showing a specific example of the profile screen 31 shown in FIG. 13. In the illustrated example, two music pieces are displayed side by side with each of the music pieces being prepared in two different types of musical composition data files for karaoke and XG standard. One of the music pieces, which is currently selected as a result of the search, is imparted with a triangular mark or right arrow. Clicking a "Price (¥200)" button below "Purchase" shown in an upper portion of the profile screen 31 allows the user to jump to the order screen 32 for ordering the musical composition data file of the music piece marked with the right arrow. Illustration of a specific example of the order screen 32 is omitted here. The profile screen 31 also includes buttons for searching for an artist, composer and lyric writer, as well as indications for linking to the musical score and other related product.

Figure 19:
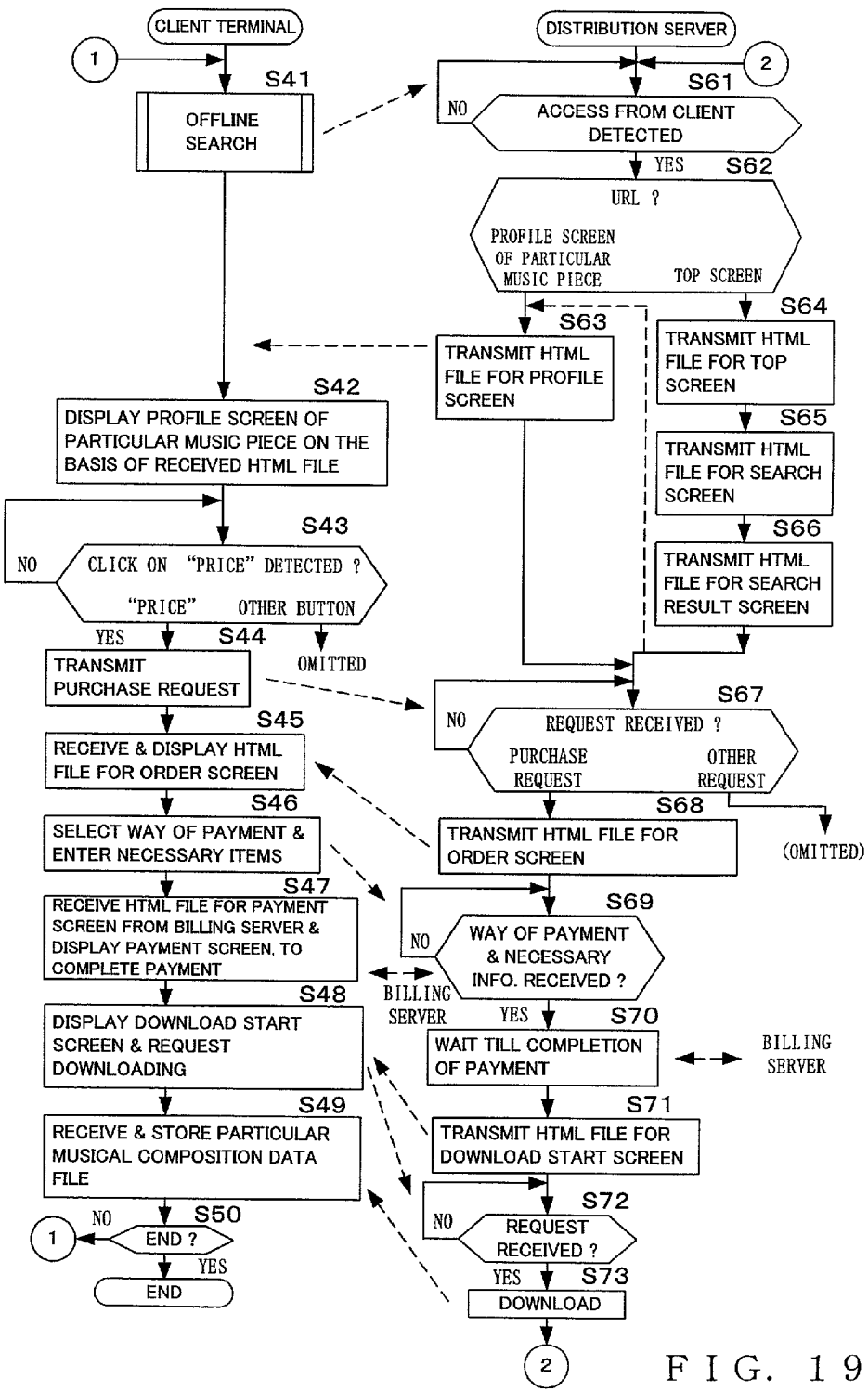
FIG. 19 is a flow chart showing exemplary behavior of the embodiment of FIG. 12.
Figure 20:
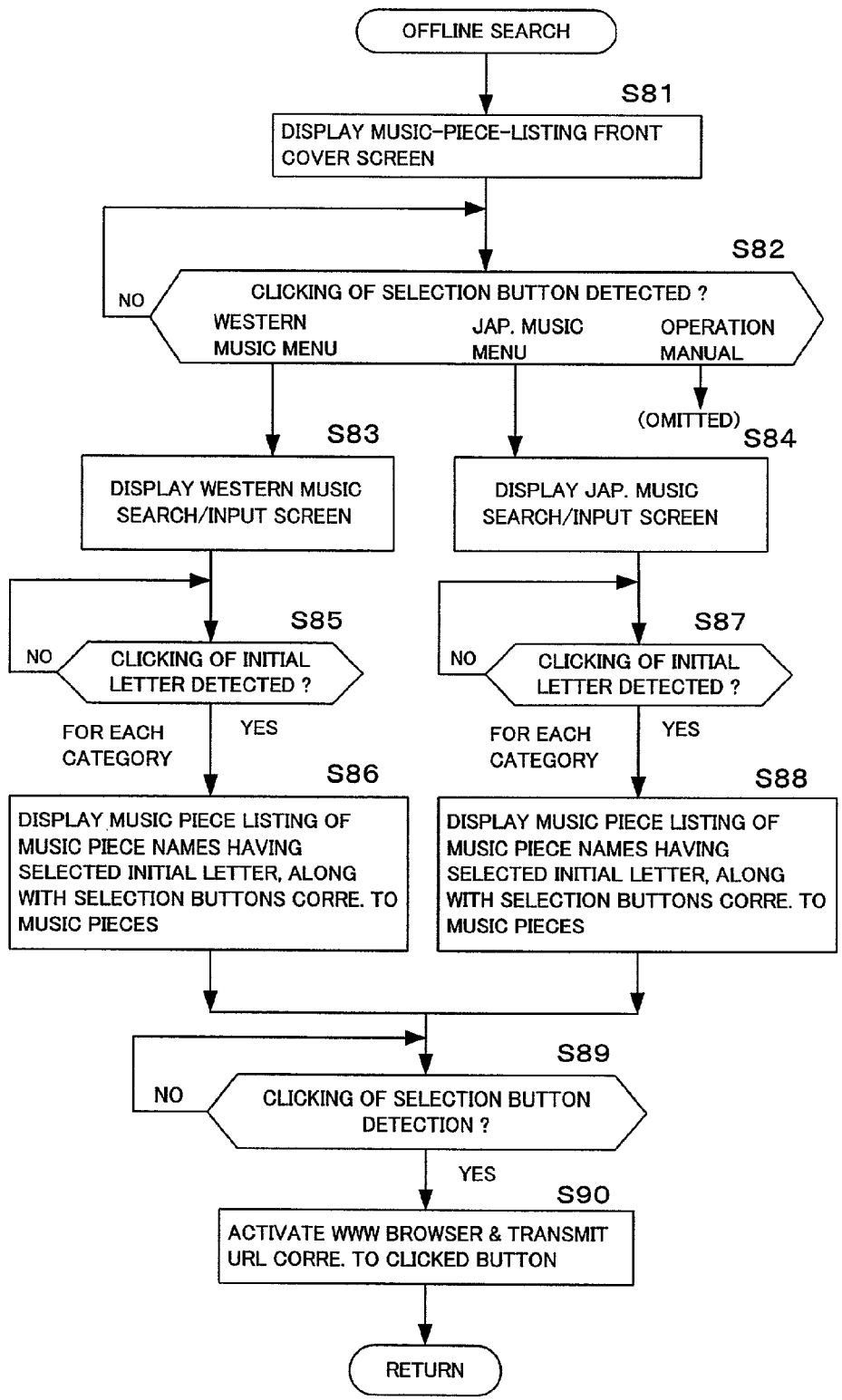
FIG. 20 is a flow chart showing details of an offline search process shown in FIG. 19.

FIG. 19 is a flow chart showing exemplary behavior of the embodiment of FIG. 12, and FIG. 20 is a flow chart showing details of the offline search process at step S41 of FIG. 19.

The online search process is first described with reference to FIG. 19. The client terminal sets an URL to the top page screen of the distribution server, so as to access the top page screen 28 (FIGS. 13 and 15) of the distribution server.

At step S61 in the server processing, a determination is made as to whether there has been any access from the client terminal. If answered in the affirmative (YES determination), the processing goes to step S62, but with a negative (NO) determination at step S61, the processing reverts to step S61. At step S62, a further determination is made as to whether the URL received from the client terminal is that of the profile screen 31 or that of the top page screen 28. If the received URL is other than the URL of the profile or top page screen 31 or 28, an operation corresponding to the other URL is carried out.

If the URL is that of the top page screen 28, the processing goes to step S64. Description about responses from the client terminals to server's operations of steps S64 to S66 is omitted. At step S64, an HTML file of the top page screen 28 is transmitted to the client terminal, which in turn displays the top page screen 28 (see FIGS. 13 and 15). At step S65, an HTML file of the search/input screen 29 is transmitted so that the client terminal displays the search/input screen 29 (see FIGS. 13 and 16A). At step S66, an HTML file of a search result screen 30 is transmitted so that the client terminal displays the search result screen 30 (see FIGS. 13 and 17). When the user of the client terminal has selected purchasing the composition data file of a particular music piece, the processing proceeds to step S67. However, when the user has clicked a "Detail" button, the processing proceeds to step S63, where an HTML file of the profile screen 31 for the particular music piece is transmitted to the client terminal. Subsequent operations are similar to those in the offline search process having been described above.

The offline search process of FIG. 20 is carried out as follows. Once the hypertext file of the music piece listing is read out from the CD-ROM, the music-piece-listing front cover screen 21 (FIGS. 13 and 22) is displayed at step S81, which includes selection buttons for the "western Music Menu", "Japanese Music Menu" and "Operation Manual". At step S82, a determination is made as to whether any one of the selection buttons has been clicked. If no clicking of one of the selection buttons has been detected at step S82, the operation of step S82 is repeated until any one of the selection buttons is clicked. If the "Western Music Menu" has been clicked, the process moves on to step S83, but the "Japanese Music Menu" has been clicked, the process moves to step S84.

At step S83, the western music search/input screen 23 of FIG. 13 is displayed, where a number in the range of "0"-"9" (only for music piece names) and alphabetical letters are shown in each of the categories, i.e. names, artists, lyric writers and composers, of music pieces. At step S85, a determination is made as to whether a desired one of the listed initial letters has been clicked in any one of the categories. If answered in the affirmative at step S85, the process moves on to step S86; otherwise, the operation of step S85 is repeated until a desired one of the listed initial letters is clicked.

Then, at step S86, there is displayed a listing of music pieces having the selected initial letter in the selected one of the categories. If the initial letter (alphanumeric) in the music piece name has been clicked as determined at step S85, a western music page is displayed at step S86 which is similar to the initial music piece listing page 24 as shown in FIGS. 13 and 14.

As set forth above, the offline search in this embodiment employs such a search result output scheme which uses the link function to display the page of the music piece listing in question. Keyword search may be used depending on the nature of software employed. As shown in FIG. 14, each of the music piece names is shown on the music piece listing page 24 along with the selection button "Access". At step S89, it is checked whether or not clicking of any one of the Access buttons has been detected. If answered in the affirmative at step S89, the process moves on to step S90, but if clicking of any one of the Access buttons has not been detected, then the checking operation of step S89 is repeated. Because the access button is associated with a hyperlink, the clicking of the Access button activates the WWW browser software program and the URL is transmitted to the communication network.

Referring back to step S42 of FIG. 19, the URL sent from the client terminal is ultimately received by the distribution server, which detects the access from the client terminal at step S61. At step S62, it is determined that the current received URL is for accessing the profile screen 31. Thus, the processing goes to step S63, where the distribution server transmits an HTML file for the profile screen 31 of the particular music piece. Then, on the basis of the HTML file received from the distribution server, the client terminal displays the profile screen 31 of the particular music piece (see FIGS. 13 and 18).

Then, at step S43, a determination is made whether any clicking with the mouse has been detected. If the "Price" button has been clicked as determined at step S43, the processing moves on to step S44. Operation when another button than the Price button has been clicked will not be described here. In case no clicking has been detected at step S43, the operation of step S43 is repeated.

At step S44, the client terminal sends a request for purchase of a user-desired product. The distribution server, at step S67, determined whether any request has been received or not. If the distribution server has received the purchase request as determined at step S67, the distribution server proceeds to step S68, but if another request than the purchase request has been received, the distribution server carries out an operation corresponding to the other request, although not specifically described herein.

At step S68, the distribution server transmits an HTML file for the order screen 32 (see FIG. 13) to the client terminal, which, at step S45, receives the HTML file for the order screen 32 and thereby displays the order screen 32. Then, at step S46, the client selects a desired way of the payment, enters other necessary items of information, and clicks a "Forward" (next) button, upon which the selected way of the payment and other entered items of information are transmitted to the distribution server. In this case, either one of two ways of the payment, i.e. payment by a credit card and payment by a prepaid card, can be selected. Then, the distribution server makes a determination at step S69 as to whether the way of the payment and other entered items of information have been duly received from the client terminal. If answered in the affirmative at step S69, the distribution server proceeds to step S70 so as to pass the processing to the billing process server and wait until a necessary billing/payment operation is completed by the billing server, but if answered in the negative, the distribution server repeats the operation of step S69 until the way of the payment and other entered items of information have been duly received from the client terminal.

The client terminal, at step S47, receives an HTML file for a payment screen from the billing server and thereby displays the payment screen, where the user enters necessary information to complete the payment. Then, the distribution server, at step S71, transmits an HTML file for a download start screen to the client terminal. Then, the client terminal, at step S48, receives the HTML file for the download start screen from the distribution server and thereby displays the download start screen to request downloading of the particular musical composition data file.

At step S72, the distribution server determines whether there has been a request for downloading of the particular musical composition data file. With an affirmative answer at step S72, the distribution server goes to step S73; otherwise, the operation of step S72 is repeated until a request for downloading of the particular musical composition data file is received from the client terminal. At step S73, the distribution server downloads the particular musical composition data file, after which the distribution server reverts to the initial operation. The client terminal, at step S49, receives and stores the particular musical composition data file downloaded from the distribution server. At next step S50, the client terminal ascertains whether the distribution service is to be terminated or not. If answered in the negative at step S50, the client terminal reverts to step S41 to repeat the operations at and after step S41.

In the instant embodiment described above, the music piece listing stored in the hypertext file storage section 13 is created by selecting only music pieces suited to particular types of equipment and data, and no order-related distinctions are made between the listed music pieces. However, in the present invention, such order-related distinctions may be made between the listed music pieces.

Figure 21A:
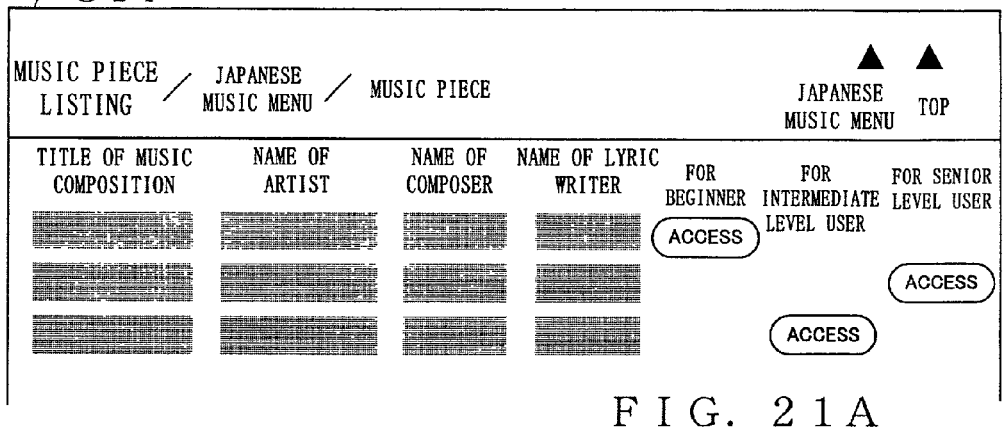
FIGS. 21A and 21B are diagrams showing an example of the music piece listing, which is explanatory of still another embodiment of the present invention.
Figure 21B:
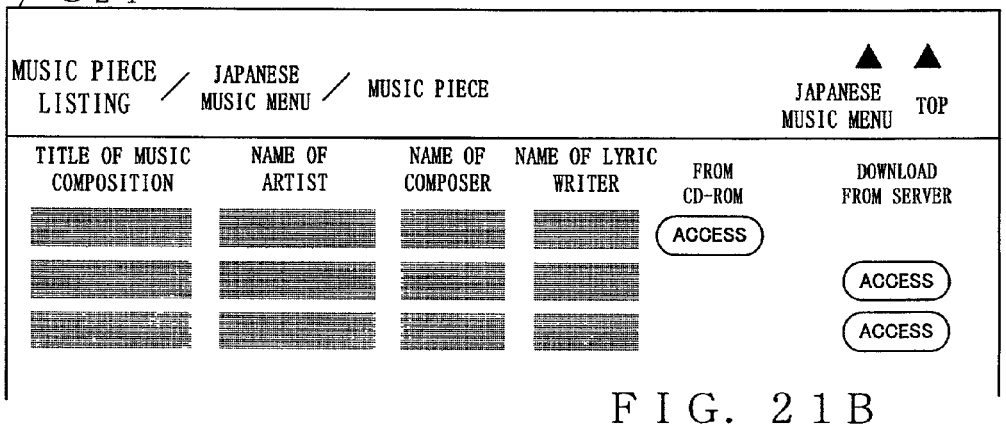

FIGS. 21A and 21B are diagrams showing examples of the music piece listing, which is explanatory of another embodiment of the present invention. More particularly, the listings in these figures are generally similar to the initial music piece listing page 24 corresponding to a user-selected initial letter of music piece names listed in the alphabetical order. In the illustrated example of FIG. 21A, the Access buttons are displayed at three different positions to be used for three different purposes. Namely, in the displayed item row for each of the music pieces, the Access button is located at one of three positions for "Beginner", "Intermediate-level User" and "Senior-level User". Although the downloaded musical composition data file may be used as a model for practicing a music performance, the performance abilities significantly vary between users. Namely, the advanced- or senior-level users usually require musical composition data rich in performance expression, but the beginners require musical composition data easy to play. However, the difficulty level of each music piece can not be clearly known by viewing the music piece listing alone.

Thus, the instant embodiment is characterized in that in creating a music piece listing, the difficulty level of each music piece is evaluated so that the display position of the Access button associated with that music piece is fixed at any one of the three positions in accordance with the difficulty level. Based on the display position of the Access button on the screen, the user can search for a music piece appropriate to his or her performance ability level and then purchase and download the musical composition data of that music piece. It is more preferable that the distribution server create and pre-store musical composition data of different difficulty levels for each music piece, in which case two or more Access buttons are displayed for each music piece. Although the display position of the Access button is varied depending on the difficulty level in the illustrated example of FIG. 21A, any other suitable display form or mode than the display position, such as the display color, shape or label characters, of the Access buttons may be differentiated between the performance ability levels of potential users.

Further, in the illustrated example of FIG. 21B, the Access buttons are displayed at two different positions to be used for two different purposes, i.e. for installation "from a CD-ROM" and for downloading "from a distribution server". In many cases, a music piece listing is stored in CD-ROMs and distributed to users in the form of the CD-ROMs attached to products or equipment such as electronic musical instruments. In such cases, musical composition data files of a plurality of music pieces for demonstration purposes may be stored in the same CD-ROMs and supplied to the users. Each of the users may supply any desired one of the demonstration-purpose musical composition data files from the CD-ROM to his or her electronic musical instrument via a flexible magnetic disk or serial cable. However, in this case, a considerable amount of time and effort would be required to locate the desired musical composition data file while viewing the directory in the CD-ROM.

However, according to the instant embodiment, any desired musical composition data file can be easily copied from the CD-ROM to a hard disk or flexible magnetic disk by including, in the music piece listing, the musical composition data files as stored in the CD-ROM and clicking the Access button associated with the desired musical composition data file. URL for a hyperlink related to the Access button is not necessarily limited to that of a server on the communication network; the music piece listing may be made previously with such a URL set under the directory stored in a hard disk.

In the example of FIG. 21B too, any other suitable display form or mode than the display position, such as the display color, shape or label characters, of the Access buttons may be differentiated between the purposes.

Further, because the above-mentioned music piece listing is distributed along with the electronic musical instrument purchased, there arises a need to properly associate the music piece listing with new music pieces released after the purchase of the electronic musical instrument.

FIG. 22 is a diagram showing another example of the music piece listing, which is explanatory of still another embodiment of the present invention. Although the example of the music piece listing is illustrated as using the music-piece-listing front page screen 21 of FIG. 13, it may be organized into any other suitable page format.

In this embodiment, any new music piece may be searched for on the line basis by accessing a predetermined search page of a selected distribution server. For this purpose, a "Network Search" button is displayed on the client terminal so that clicking this Network Search button allows the user to jump to the top page screen 28 or search/input screen 29 of the distribution server designated as a hyperlink destination. However, in this case, the online search, rather than the offline search, takes place. Because the music piece listing is a PDF (Portable Document Format) file as noted earlier, it can be easily downloaded from the distribution server. Thus, it is only necessary for the distribution server to previously upload, for each type of equipment and data, a revised or upgraded music piece listing. In this case, a "New Music Piece Listing Download" button is displayed on the client terminal so that the user can readily download the updated music piece listing from the distribution server. Hyperlink may be made by associating the display of the New Music Piece Listing Download button with an URL of a starting screen for downloading the new music piece listing through an HTTP or FTP protocol.

In the embodiments described so far, each musical composition data file has been described as being a MIDI data file. However, the musical composition data file may comprise data of sampled tones or voices, in which case it is preferable that the data be compressed in accordance with the known MP3 (MPEG-1 Audio Layer 3) scheme. Further, in the above-described embodiments, a user-desired musical composition data file is downloaded via the storage section of the personal computer. In an alternative, the electronic musical instrument may be provided with a network-connecting communication interface and have the function of the hypertext processing section 11 shown in FIG. 12 so that it can be connected directly to a desired distribution server on the communication network X to download a desired musical composition data file from the server. Further, the personal computer may be replaced with a cellular phone, fixed phone, television set or game device which has the Internet-connecting function. The downloaded musical composition data can be performed on these devices too.

Whereas the embodiments of the present invention have been described in relation to the musical composition data distribution service, these embodiments may also be applied to searches for other kinds of information products or digital contents distributable via a communication network than the above-mentioned musical composition data and voice data, such as musical score data and data of still images like still pictures and paintings, moving pictures like movies, game software, news, statistical materials, etc. Furthermore, the embodiments of the present invention may be applied to services via which ordinary products, rather than the information products, are ordered by users, in order to search for a desired product to be ordered.

Furthermore, in the foregoing descriptions, the music piece listing stored in the hypertext file storage section 13 has been described as created by selecting only music pieces suited to particular types of equipment and data. However, depending on the nature of information product or ordinary tangible product to be located or searched for, the types of the products prestored in a locale hypertext file need not be limited to those searchable on the online basis; for example, a scope of the off line search may be modified to include only pre-selected ones of online searchable products, depending on preference, age, sex and/or the like of each individual user, so that the offline search scope fits the user.

According to the above-described embodiments of the present invention, the user is allowed to select a desired product, such as a musical composition data file, on the offline basis and then proceed to a step of ordering the desired product. Thus, the user can search for the desired product taking a sufficient time, without having to get connected to a communication network, with the result that the necessary cost for the search can be greatly reduced. In addition, because an ordering file, such as a music piece listing, is made only of pre-selected products like musical composition data files suited to particular electronic musical instruments or tone generator apparatus, an efficient search for a desired product is achieved by the embodiments of the present invention. Furthermore, because the offline search significantly differs from the online network search in timing constraints and amount of data necessary for the search, it can be carried out in a considerably different manner from the online network search. For example, the offline search can be made in a manner very close to the traditional search method that was performed by a human using paper media, so that the offline search can be quite easy for the user to use.

What is claimed is:

1. A method for execution by a server on a network for supplying music piece data file to a client terminal, said method comprising:

receiving, from said client terminal, first request information designating a desired single music piece;

transmitting, to said client terminal, musical score data derived from a desired music piece data file corresponding to the desired single music piece designated by said first request information received from said client terminal, the musical score data including a series of musical score display event data for displaying an entire musical score of the desired single music piece, so that the entire musical score of the desired single music piece is displayed in said client terminal on the basis of the musical score data, wherein the desired music piece data file includes playback data for reproducing the desired single music piece and said musical score data, and wherein the playback data includes setting information and a series of reproduction event data;

receiving, from said client terminal, second request information designating a desired portion of the entire musical score of the music piece displayed in said client terminal, said desired portion being selected, by a user of said client terminal, from the displayed entire musical score of the music piece;

on the basis of the desired music piece data file and in accordance with said second request information received from said client terminal, creating a partial music piece data file corresponding to the desired portion designated by said second request information, the partial music piece data file including entire setting information having entirety of the setting information of the playback data copied therein, partial playback data having a series of partial reproduction event data extracted partially from the series of reproduction event data of the playback data, and partial musical score data having a series of partial musical score display event data extracted partially from the series of musical score display event data of the musical score data;

on the basis of said second request information, determining a selling price of the created partial music piece data file to be less than a selling price of the desired music piece data file, the selling price of the created partial music piece data being dependent upon one of a length and a location of the designated desired portion; and transmitting the created partial music piece data file to the client terminal.

2. A method as claimed in claim 1 wherein said server includes a storage device for storing a complete music piece data file corresponding to the desired single music piece.

3. A method for execution by a client apparatus on a network to receive a music piece data file via the network from a server, said method comprising:

transmitting, to said server, first request information designating a desired single music piece;

receiving, from said server, musical score data including a series of musical score display event data for displaying an entire musical score of the desired single music piece, the musical score data being derived from a desired music piece data file provided in said server and corresponding to the desired single music piece. the desired music piece data file including playback data for reproducing the desired single music piece and said musical score data, wherein the playback data including setting information and a series of reproduction event data;

displaying the entire musical score of the desired single music piece on the basis of the musical score data;

receiving user's selection of a desired portion designated from the displayed entire musical score of the desired single music piece and transmitting, to said server, second request information indicating the designated desired portion, wherein said server creates a partial music piece data file corresponding to the designated desired portion on the basis of the desired music piece data file and in accordance with the transmitted second request information, the partial music piece data file including entire setting information having entirety of the setting information of the playback data copied therein, partial playback data having a series of partial reproduction event data extracted partially from the series of reproduction event data of the playback data, and partial musical score data having a series of partial musical score display event data extracted partially from the series of musical score display event data of the musical score data, wherein said server determines a selling price of the created partial music piece data file to be less than a selling price of the desired music piece data file, and wherein the selling price of the created partial music piece data file is dependent upon one of a length and a location of the designated desired portion;

inputting billing-related information and transmitting the billing-related information to said server to thereby effect purchase of the desired portion designated from the displayed entire musical score of the desired single music piece; and receiving, from said server, said partial music piece data file created by said server and corresponding to the desired portion designated by said second request information.

4. A method as claimed in claim 3 wherein the predetermined billing-related information is at least one of a credit card number, an address to which an application form for remittance is to be sent, and user information for use of electronic money.

5. A server apparatus for supplying music piece data file to a client terminal, said apparatus comprising a programmed processor device for executing the steps of:

receiving, from client terminal, first request information designating a desired single music piece;

transmitting, to said client terminal, musical score data derived from a desired music piece data file corresponding to the desired single music piece designated by said first request information received from said client terminal, the musical score data including a series of musical score display event data for displaying an entire musical score of the desired single music piece so that the entire musical score of the desired single music piece is displayed in said client terminal on the basis of the musical score data, the desired music piece data file including playback data for reproducing the desired single music piece and said musical score data, wherein the playback data including setting information and a series of reproduction event data;

receiving, from said client terminal, second request information designating a desired portion of the entire musical score of the music piece displayed in said client terminal, said desired portion being selected, by a user of said client terminal, from the displayed entire musical score of the music piece;

on the basis of the desired music piece data file and in accordance with said second request information received from said client terminal, creating a partial music piece data file corresponding to the desired portion designated by said second request information, the partial music piece data file including entire setting information having entirety of the selling information of the playback data copied therein; partial playback data having a series of partial reproduction event data extracted partially from the series of reproduction event data of the playback data, and partial musical score data having a series of partial musical score display event data extracted partially from the series of musical score display event data of the musical score data;

on the basis of said second request information, determining a selling price of the created partial music piece data file, to be less than a selling price of the desired music piece data file, the selling price of the created partial music piece data being dependent upon one of a length and a location of the designated desired portion; and transmitting the created partial music piece data file to the client terminal.

6. A client apparatus operatively coupled to a network for receiving a music piece data file via the network from a server, said client apparatus operatively coupled to a display device and an input device, said client apparatus comprising a programmed processor device programmed to execute the steps of:

transmitting, to said server, first request information designating a desired single music piece;

receiving, from said server, musical score data including a series of musical score display event data for displaying an entire musical score of the desired single music piece on the display device, the musical score data being derived from a desired music piece data file provided in said server and corresponding to the desired single music piece, the desired music piece data file including playback data for reproducing the desired single music piece and said musical score data, wherein the playback data including setting information and a series of reproduction event data;

displaying on the display device the entire musical score of the desired single music piece on the basis of the musical score data;

receiving user's selection through said input device, of a desired portion designated from the displayed entire musical score of the desired single music piece and transmitting, to said server, second request information indicating the designated desired portion, wherein said server creates a partial music piece data file corresponding to the designated desired portion on the basis of the desired music piece data file and in accordance with the transmitted second request information, the partial music piece data file including entire setting information having entirety of the setting information of the playback data copied therein, partial playback data having a series of partial reproduction event data extracted partially from the series of reproduction event data of the playback data, and partial musical score data having a series of partial musical score display event data extracted partially from the series of musical score display event data of the musical score data, wherein said server determines a selling price of the created partial music piece data file to be less than a selling price of the desired music piece data file, and wherein the selling price of the created partial music piece data file is dependent upon one of a length and a location of the designated desired portion;

receiving from said input device billing-related information;

transmitting the billing-related information to said server to thereby effect purchase of the desired portion designated from the displayed entire musical score of the desired single music piece; and receiving, from said server, said partial music piece data file created by said server and corresponding to the desired portion designated by said second request information.

* * * * *

UNITED STATES PATENT AND TRADEMARK OFFICE
CERTIFICATE OF CORRECTION

PATENT NO. : 7,428,534 B2  
APPLICATION NO. : 09/823704  
DATED : September 23, 2008  
INVENTOR(S) : Shinichi Ito et al.

Page 1 of 1

It is certified that error appears in the above-identified patent and that said Letters Patent is hereby corrected as shown below:

Title page, item should read as follows:

(75) Inventors: Taro Tokuhiro, Hamamatsu (JP); Seiichi Yamaguchi, Hamamatsu (JP); Hisanori Murakami, Hamamatsu (JP)

Signed and Sealed this

Twenty-fourth Day of March, 2009

JOHN DOLL  
*Acting Director of the United States Patent and Trademark Office*